US012451056B2

(12) United States Patent
Jiao et al.

(10) Patent No.: US 12,451,056 B2
(45) Date of Patent: Oct. 21, 2025

(54) SYSTEMS AND METHODS FOR MITIGATING MICRO-LED FAILURES

(71) Applicant: Apple Inc., Cupertino, CA (US)

(72) Inventors: Shengzhe Jiao, San Diego, CA (US); Arjunsimha Chaturbhuj, San Jose, CA (US); Chen Chen, San Jose, CA (US); Derek K Shaeffer, Redwood City, CA (US); Dongwon Kwon, Cupertino, CA (US); Feng Yu, Sunnyvale, CA (US); Haojiang Zhou, San Jose, CA (US); Hari P Paudel, Milpitas, CA (US); Henry C Jen, Los Altos, CA (US); Hopil Bae, Palo Alto, CA (US); Jialin Liu, Cupertino, CA (US); Ling Zhang, Saratoga, CA (US); Majid Gharghi, San Carlos, CA (US); Nikhil Acharya, Mountain View, CA (US); Pablo Moreno Galbis, Burlingame, CA (US); Ruofan Zhang, San Jose, CA (US); Stanley B Wang, Cupertino, CA (US); Sunmin Jang, Sunnyvale, CA (US); Wei H Yao, Saratoga, CA (US); Wei Xiong, Mountain View, CA (US); Xia Li, San Jose, CA (US); Xiang Lu, Saratoga, CA (US); Yongjie Jiang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/677,639

(22) Filed: May 29, 2024

(65) Prior Publication Data

US 2025/0285578 A1 Sep. 11, 2025

Related U.S. Application Data

(60) Provisional application No. 63/562,038, filed on Mar. 6, 2024.

(51) Int. Cl.
*G09G 3/32* (2016.01)
*H05B 47/17* (2020.01)
*H05B 47/29* (2020.01)

(52) U.S. Cl.
CPC ............ *G09G 3/32* (2013.01); *H05B 47/172* (2024.01); *H05B 47/29* (2020.01); (Continued)

(58) Field of Classification Search
CPC ............ G09G 3/32; G09G 2320/0276; G09G 2320/0646; G09G 2330/10; G09G 2330/12; H05B 47/29; H05B 47/172
See application file for complete search history.

(56) References Cited

U.S. PATENT DOCUMENTS

2005/0231459 A1* 10/2005 Furukawa .......... H05B 45/3725 345/102
2019/0136311 A1 5/2019 Turner et al.
(Continued)

FOREIGN PATENT DOCUMENTS

CN 212211464 U 12/2020
CN 112566307 A 3/2021
(Continued)

*Primary Examiner* — Michael Pervan
(74) *Attorney, Agent, or Firm* — Fletcher Yoder, P.C.

(57) ABSTRACT

A display system may include a plurality of light emitting diodes to emit light, where each of the light emitting diodes are connected in parallel and a plurality of first switches respectively coupled to the plurality of light emitting diodes. A first switch of the plurality of first switches is coupled in parallel to a first light emitting diode. The first switch may short the first light emitting diode of the plurality of light emitting diodes through a defined resistor having a defined value that therefore draws a defined short circuit current.

20 Claims, 19 Drawing Sheets

(52) U.S. Cl.
CPC ............... *G09G 2320/0276* (2013.01); *G09G 2320/0646* (2013.01); *G09G 2330/10* (2013.01); *G09G 2330/12* (2013.01)

(56) References Cited

U.S. PATENT DOCUMENTS

| | | | | |
|---|---|---|---|---|
| 2020/0193905 | A1* | 6/2020 | Yoon | G09G 3/3233 |
| 2021/0287589 | A1 | 9/2021 | Xu et al. | |
| 2023/0091644 | A1 | 3/2023 | Charisoulis et al. | |
| 2023/0137365 | A1 | 5/2023 | Hong et al. | |
| 2023/0282163 | A1 | 9/2023 | Hamer et al. | |

FOREIGN PATENT DOCUMENTS

| | | | |
|---|---|---|---|
| CN | 114999398 | A | 9/2022 |
| CN | 115394241 | A | 11/2022 |
| CN | 115424585 | A | 12/2022 |

* cited by examiner

SYSTEMS AND METHODS FOR MITIGATING MICRO-LED FAILURES

CROSS-REFERENCE TO RELATED APPLICATIONS

This application claims priority to U.S. Provisional Application No. 63/562,038, filed Mar. 6, 2024, which is incorporated by reference herein in its entirety.

SUMMARY

The present disclosure relates generally to systems and devices for identifying and/or mitigating light emitting diodes (LEDs) that are operating unexpectedly in a display panel.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic displays may display images that present visual representations of information. Accordingly, numerous electronic systems such as computers, mobile phones, portable media devices, tablets, televisions, virtual-reality headsets, and vehicle dashboards, among many others often include or use electronic displays. In any case, an electronic display may generally display an image by actively controlling light emission from its display pixels. By adjusting the brightness of different color components of the display pixels, a variety of different colors may be generated that collectively produce a corresponding image.

The electronic display may take a variety of forms. For example, the electronic display may be a digital display such as a micro-light-emitting diode (LED) display. A micro-LED display includes active matrixes of micro-LEDs driven by pixel drivers (e.g., often referred to as micro-drivers). Each micro-driver may drive a number of display pixels on the electronic display. For example, each micro-driver may be connected to numerous anodes, and each anode may selectively connect to multiple different display pixels (one at a time). The display pixels may be connected in parallel on a respective anode. Thus, a collection of display pixels may share a common anode connected to a micro-driver. The micro-driver may drive a display pixel by providing a driving signal across the respective anode to one display pixel of the collection of display pixels.

The anode may attach to multiple micro-LEDs coupled in parallel that may be driven to emit light by the micro-driver. For example, the micro-driver may drive the micro-LEDs, usually one at a time, to emit light by providing a current and selecting one of the micro-LEDs to couple to a particular voltage. The micro-LEDs may correspond to the collection of display pixels described above. In some cases, a micro-LED of the anode may fail (e.g., malfunction, be defective). The failed micro-LED may continue to draw current from the micro-driver even when the failed micro-LED has not been selected. By drawing current away from a selected micro-LED, the failed micro-LED may cause the other micro-LED to emit the wrong amount of light (e.g., have a lower luminance). As a result, the micro-LEDs located along the same anode that includes the failed micro-LED may have a perceivable visual image artifact. For example, a corresponding column of display pixels may appear darker than intended (e.g., in comparison to target luminance levels in image data, in comparison to surrounding luminance levels in one frame of image content) in the image content.

To reduce or eliminate these perceivable visual image artifacts, the failed micro-LED may be detected using a sensing scheme and the resulting current loss may be mitigated (e.g., compensated) using a compensation scheme (e.g., mitigation scheme). The failed micro-LED may be detected using sensing circuitry during manufacturing and/or in the field. The sensing circuitry that may be shared with (e.g., integrated with) other sensors, such as a touch sensor. For example, sensing circuitry may cause a first switch to open to stop current flow from the micro-driver and cause a second switch to close to provide a bias voltage to drive a respective micro-LED for testing. If the micro-LED is partially short-circuited, then the sensing circuitry may determine that the micro-LED may be malfunctioning. In other words, if the current flows across the micro-LED due to forward-biasing the micro-LED, then the micro-LED may be determined to be malfunctioning (e.g., failed). If the micro-LED does not return a current, then the sensing circuitry may determine that the micro-LED is operative (e.g., functional). The sensing circuitry may individually test the micro-LEDs along a respective anode to identify micro-LEDs that may be malfunctioning or otherwise not operating as expected. Additionally or alternatively, the micro-LEDs may be tested by driving each micro-LED with a test current to determine if the micro-LED emits a particular brightness during manufacturing. As such, malfunctioning micro-LEDs may be identified during manufacturing and/or in the field.

If a failed micro-LED is identified, a switch coupled to the failed micro-LED may close to cause current to be shunted around the failed micro-LED. The switch may include defined resistor having a defined value that therefore draws a defined short circuit current. As such, perceivable visual image artifacts caused by the failed micro-LED may be reduced or eliminated. In certain instances, a cathode coupled to the failed micro-LED may be pre-charged and floated to mitigate the failed micro-LED. Additionally or alternatively, image data for micro-LEDs proximate the failed micro-LED (disposed on the same anode, disposed on neighboring anodes, disposed on the same cathode, disposed on neighboring cathodes) may be compensated accordingly. For example, a gain mask may be applied to image data for surrounding micro-LEDs (e.g., display pixels) of the failed micro-LED to adjust the image data, thereby reducing or eliminating the perceivable visual image artifact caused by the failed micro-LED. Additionally or alternatively, the image data for the failed micro-LED may be set to a gray level 0 (e.g., black) to reduce current stress and/or voltage stress on the failed micro-LED, which may reduce or eliminate additional degradation to the failed micro-LED. In another example, the gray level originally intended for the failed micro-LED may be distributed to other micro-LEDs along the anode and/or neighboring micro-LEDs on different anodes and/or different cathodes, which may reduce or eliminate perceivable image artifacts caused by the failed micro-LED. As such, the failed micro-LED may be identified and mitigated, thereby reducing or eliminating perceivable visual image artifacts.

Various refinements of the features noted above may exist in relation to various aspects of the present disclosure. Further, features may also be incorporated in these various aspects as well. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
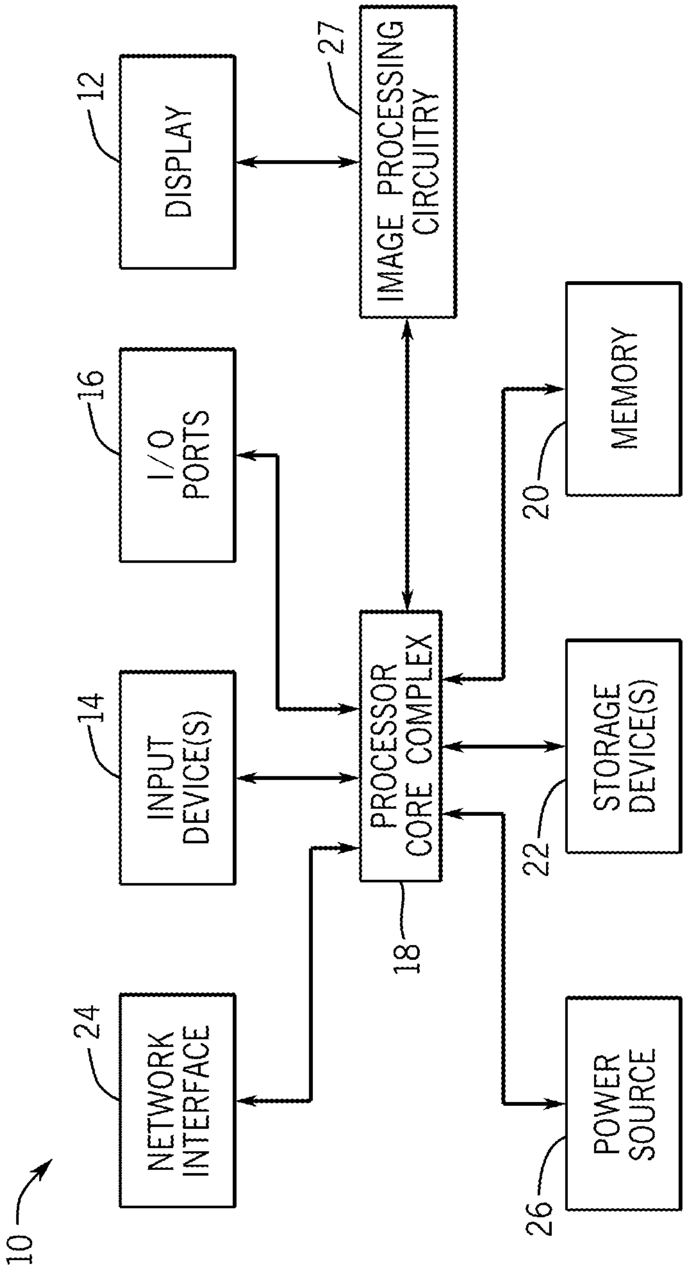
FIG. 1 is a block diagram of an electronic device with an electronic display, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

The present disclosure provides techniques for identifying (e.g., testing) and/or mitigating failed micro-light emitting diodes (micro-LEDs) of an electronic display. Some electronic displays may use multiple micro-LEDs that emit light at a target luminance level to create a frame of image content for display. The micro-LEDs may be organized in rows (e.g., cathodes) and columns (e.g., anodes). The anode may be coupled to a micro-driver that provides a current to drive the micro-LEDs to emit light at different times. In some cases, if a failed micro-LED draw current away from other micro-LEDs along the anode, thereby reducing current provided to the other micro-LEDs during operation. The failed micro-LED may not emit light and/or emit light at lower luminance levels (e.g., in comparison to target luminance levels), thereby causing perceivable visual image artifacts. Additionally or alternatively, the other micro-LEDs may emit light the wrong amount of light due to the failed micro-LED drawing current away from the other micro-LEDs.

As such, the systems and methods described herein disclose a sensing/compensation scheme for identifying a failed micro-LED, compensating for the failed micro-LED, or a combination thereof. In particular, a forward bias of a micro-LED during the sensing scheme may be controlled by setting a bias display voltage ($V_{bias\_disp}$). For example, sensing circuitry may individually test the micro-LEDs along a respective anode to identify failed micro-LEDs. This sensing circuitry may, in some embodiments, be shared with other sensors in the system, such as a touch sensor. The sensing circuitry may drive a respective micro-LED using a common mode bias voltage and determine if current flows through the respective micro-LED. The sensing circuitry may determine that the respective micro-LED is operational if current does not flow from the respective micro-LED. The sensing circuitry may determine that the respective micro-LED failed if current flows from the respective micro-LED. In other words, the current may flow in an undesired short circuit parallel to the failed micro-LED. If the micro-LED failed, the sensing circuitry may close a switch with a defined resistor having a defined value to shunt current around the failed micro-LED with a defined short circuit current, which may reduce or eliminate perceivable image artifacts caused by the failed micro-LED. In some cases, the micro-driver may adjust the current provided to an anode with a failed micro-LED to compensate for the defined short circuit current. In fact, in some cases, the defined resistor may even draw additional current far more than the amount that the failed micro-LED had been drawing, but the defined resistor may draw a known amount of current. Thus, the current supplied to the anode may be the desired driving current plus the current that is known to be drawn over the defined resistor. In this way, perceivable visual image artifacts caused by the failed micro-LED may be reduced or eliminated.

Additionally or alternatively, image data for one or more micro-LEDs proximate the failed micro-LED may be adjusted to compensate for the failed micro-LED. For example, a gain mask may be applied to the image data intended for micro-LEDs along the same anode as the failed micro-LED. The gain mask may adjust the gray level and/or distribute the gray level intended for the micro-LED to the other micro-LEDs. For example, current provided to the other micro-LEDs along the same anode may be increased to drive the other micro-LEDs to a target luminance, thereby compensating for the failed micro-LED. Additionally or alternatively, the image data for to the failed micro-LED may be set to gray level 0 (e.g., black) to reduce current stress on the failed micro-LED and/or a magnitude and a polarity of voltage stress on the failed micro-LED may be adjusted by a bias voltage. In certain instances, reducing current stress and/or voltage stress to a failed micro-LED may reduce additional degradation to the failed micro-LED. By compensating for the failed micro-LED, perceivable visual image artifacts caused by the failed micro-LED may be reduced or eliminated.

With the preceding in mind, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include—sensing components in the electronic display 12. The touch sensing components (e.g., touch sensor) may receive user inputs by detecting occurrence or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

Figure 2:
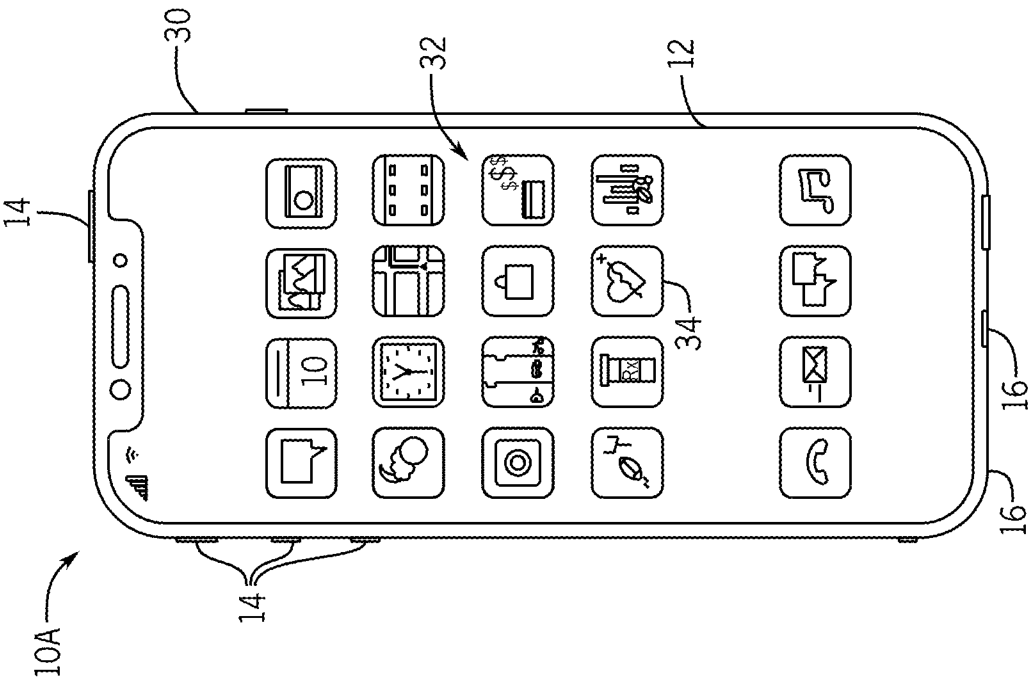
FIG. 2 is a front view of a handheld device representing another embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smartphone, such as an iPhone® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
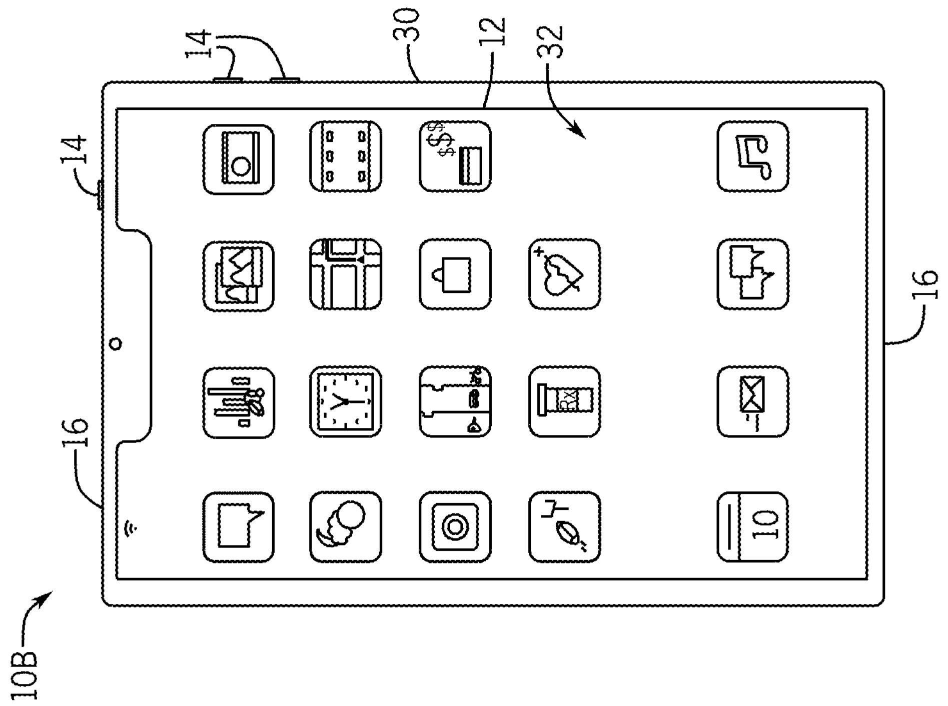
FIG. 3 is a front view of another handheld device representing another embodiment of the electronic device of FIG. 1.
Figure 4:
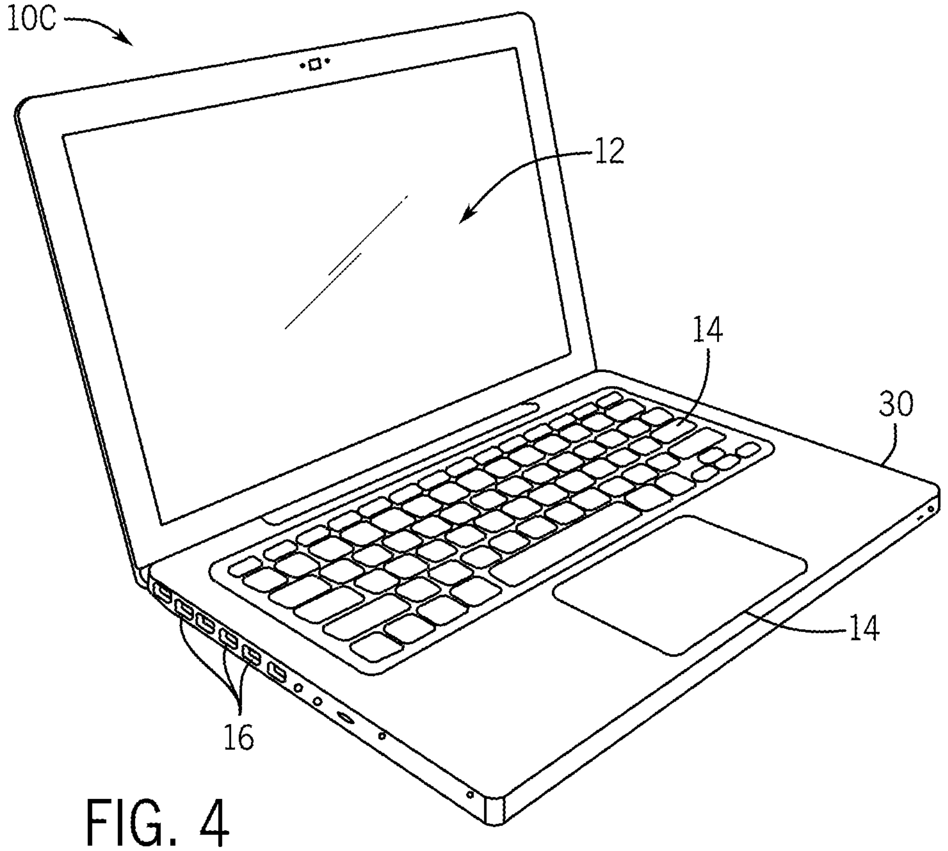
FIG. 4 is a perspective view of a notebook computer representing an embodiment of the electronic device of FIG. 1.
Figure 5:
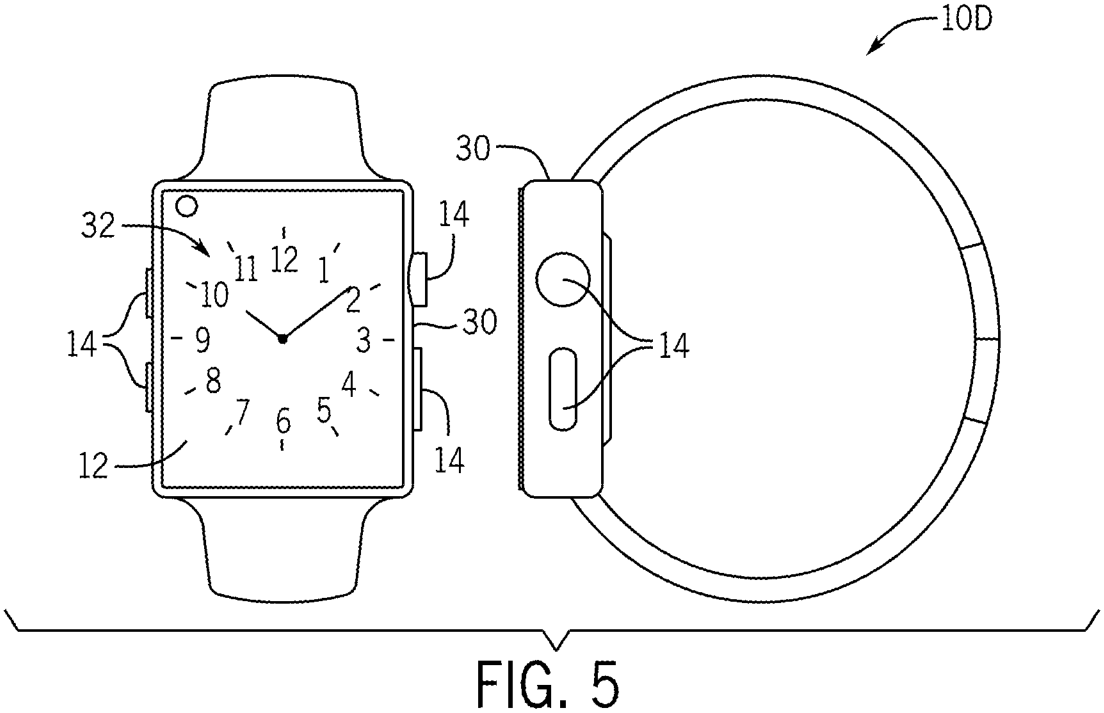
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
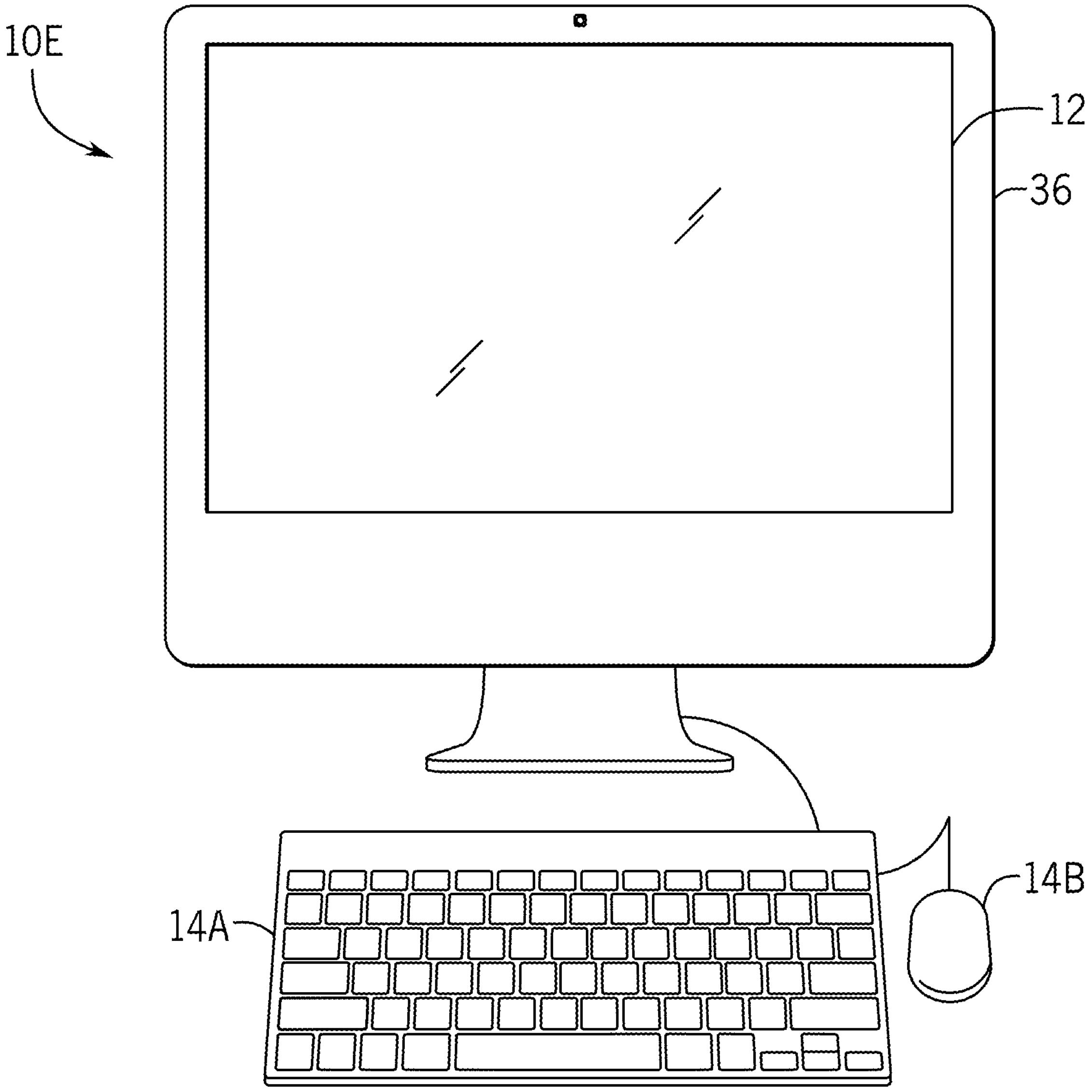
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures (e.g., input devices 14), such as the keyboard 14A or mouse 14B, which may connect to the computer 10E.

Figure 7:
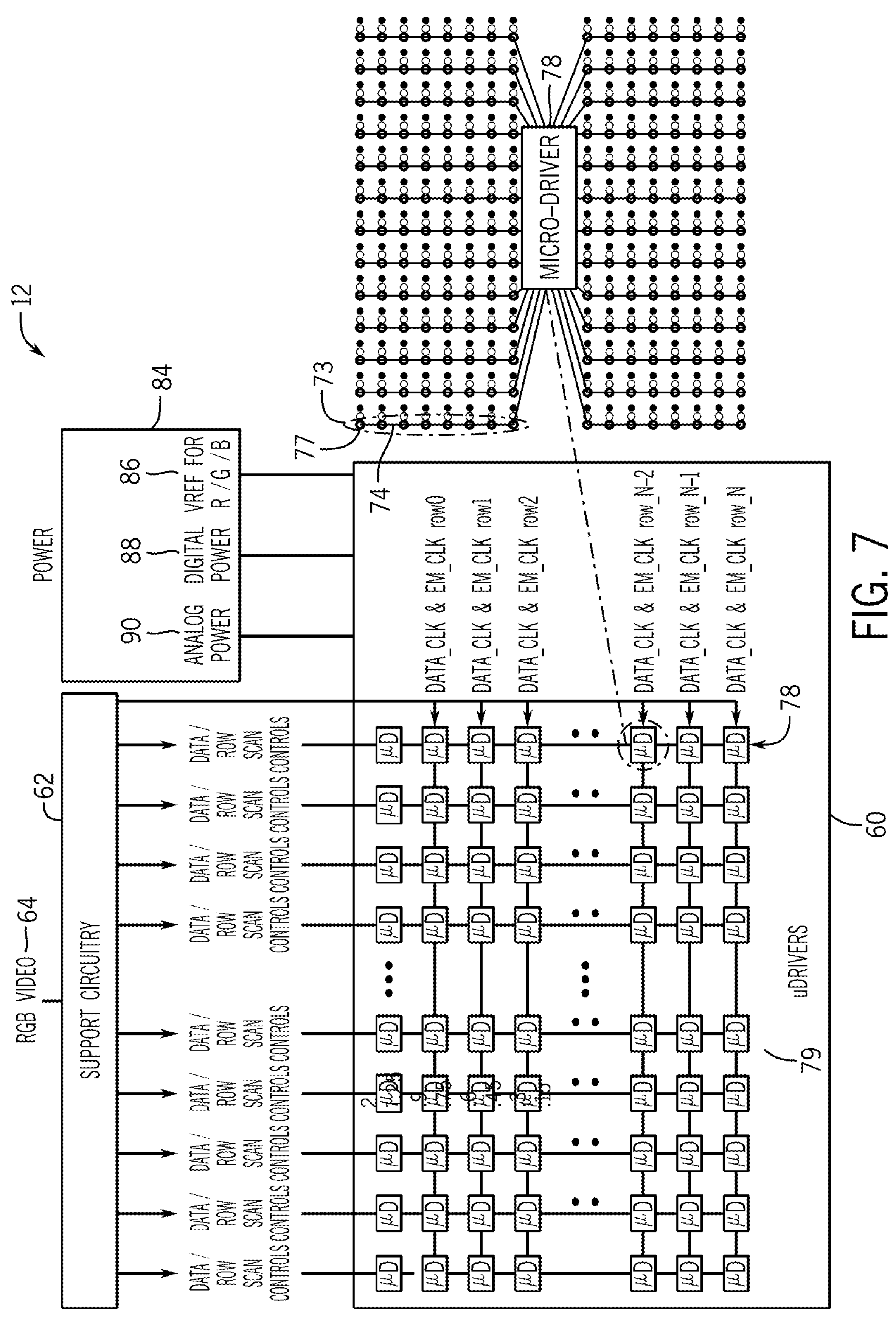
FIG. 7 is a block diagram of a micro-LED display that employs micro-drivers to drive display pixels with controls signals, in accordance with an embodiment.

FIG. 7 depicts a block diagram of an example architecture of the electronic display 12 (e.g., micro-LED display 12). In the example of FIG. 7, the micro-LED display 12 uses an RGB display panel 60 with pixels that include red, green, and blue micro-LEDs as display pixels. Support circuitry 62 may receive RGB-format video image data 64. It should be appreciated, however, that the micro-LED display 12 may display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or an emission clock signal (EM_CLK) to control the provision of the image data 64 in the micro-LED display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

In particular, the display panel 60 columns include micro-drivers 78. The micro-drivers 78 are arranged in an array 79. The micro-drivers 78 may receive and/or pass on various signals sent from the support circuitry 62. By way of example, micro-drivers 78 on the left-hand side of the display may receive row scan control signals and pass those signals that correspond to its particular row to other micro-drivers 78 in that row of micro-drivers. Each micro-driver 78 drives a number of display pixels 77. Different display pixels (e.g., display sub-pixel) 77 may include different colored micro-LEDs (e.g., a red micro-LED, a green micro-LED, or a blue micro-LED) to represent the image data 64 in RGB format. Although one of the micro-drivers 78 of FIG. 7 is shown to drive twenty-six anodes 73 having eight display pixels 77 each, each micro-driver 78 may drive more or fewer anodes 73 (e.g., 8 anodes, 9 anodes, 10 anodes, 11 anodes, 12 anodes, 14 anodes, 15 anodes, 16 anodes, 17 anodes, 18 anodes, and so forth) and respective display pixels 77. As illustrated, the subset of display pixels 77 located on each anode 73 may be associated with a particular color (e.g., red, green, or blue). As mentioned above, it should be noted that a respective cathode corresponds to a subset of display pixels 77 associated with a particular color even though each cathode for a particular color channel is not illustrated in FIG. 7. For example, cathode corresponds to a red color channel (e.g., subset of red display pixels 77). There may be a second set of cathodes that couple to a green color channel (e.g., subset of green display pixels 77) and a third set of cathodes that couple to a blue color channel (subset of blue display pixels 77), but these are not expressly illustrated in FIG. 7 for ease of illustration.

The display pixels 77 driven by each micro-driver 78 may be arranged as a local passive matrix (LPM). In one example, each micro-driver 78 drives two local passive matrices (LPMs) of display pixels 77, one above the micro-driver 78 and one below the micro-driver 78. Before continuing, it should be appreciated that the array 79 may have LPM columns that include multiple different LPMs that are driven by different micro-drivers 78. For each LPM, different display pixels 77 may include different combinations of colored micro-LEDs (e.g., a red micro-LED, a green micro-LED, or a blue micro-LED) to represent the image data 64 in RGB format. For example, the combinations may include a red micro-LED and a green micro-LED, a blue micro-LED and a green micro-LED, a red micro-LED and a blue micro-LED, and so on.

A power supply 84 may provide a reference voltage ($V_{REF}$) 86 to drive the micro-LEDs, a digital power signal 88, and an analog power signal 90. In some cases, the power supply 84 may provide more than one reference voltage ($V_{REF}$) 86 signal. Namely, display pixels 77 of different colors may be driven using different reference voltages. As such, the power supply 84 may provide more than one reference voltage ($V_{REF}$) 86. Additionally or alternatively, other circuitry on the display panel 60 may step the reference voltage ($V_{REF}$) 86 up or down to obtain different reference voltages to drive different colors of micro-LED.

Figure 8:
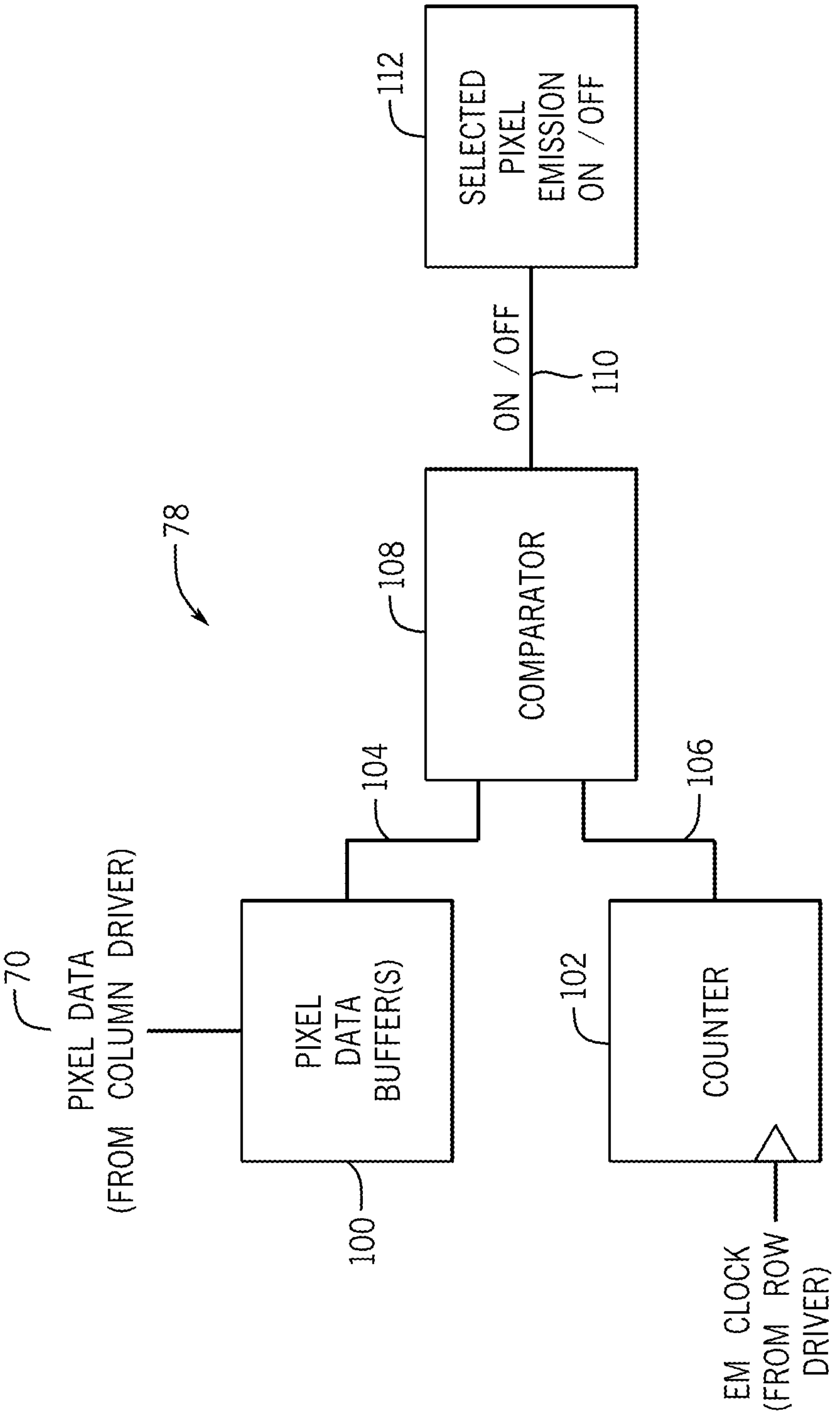
FIG. 8 is a block diagram schematically illustrating an operation of a micro-driver of FIG. 7, in accordance with an embodiment of the present disclosure.

A block diagram shown in FIG. 8 illustrates some of the components of one of the micro-drivers 78. The micro-driver 78 shown in FIG. 7 includes pixel data buffer(s) 100 and a digital counter 102. The pixel data buffer(s) 100 may include sufficient storage to hold image data 70 that is provided (e.g., as a digital code). For instance, the micro-driver 78 may include pixel data buffers to store image data 70 for a display pixel 77 at any one time (e.g., for 8-bit image data 70, this may be 24 bits of storage). It should be appreciated, however, that the micro-driver 78 may include more or fewer buffers, depending on the data rate of the image data 70 and the number of display pixels 77 included in the image data 70. The pixel data buffer(s) 100 may take any suitable logical structure based on the order that the column driver provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the micro-driver 78 may provide the emission clock signal (EM_CLK). A digital counter 102 may receive the emission clock signal (EM_CLK) as an input. The pixel data buffer(s) 100 may output enough of the stored image data 70 to output a digital data signal 104 representing a desired gray level for a particular display pixel 77 that is to be driven by the micro-driver 78. The digital counter 102 may also output a digital counter signal 106 indicative of the number of edges (only rising, only falling, or both rising and falling edges) of the emission clock signal (EM_CLK) 98. The signals 104 and 106 may enter a comparator 108 that outputs an emission control signal 110 in an "on" state when the signal 106 does not exceed the digital data signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 9:
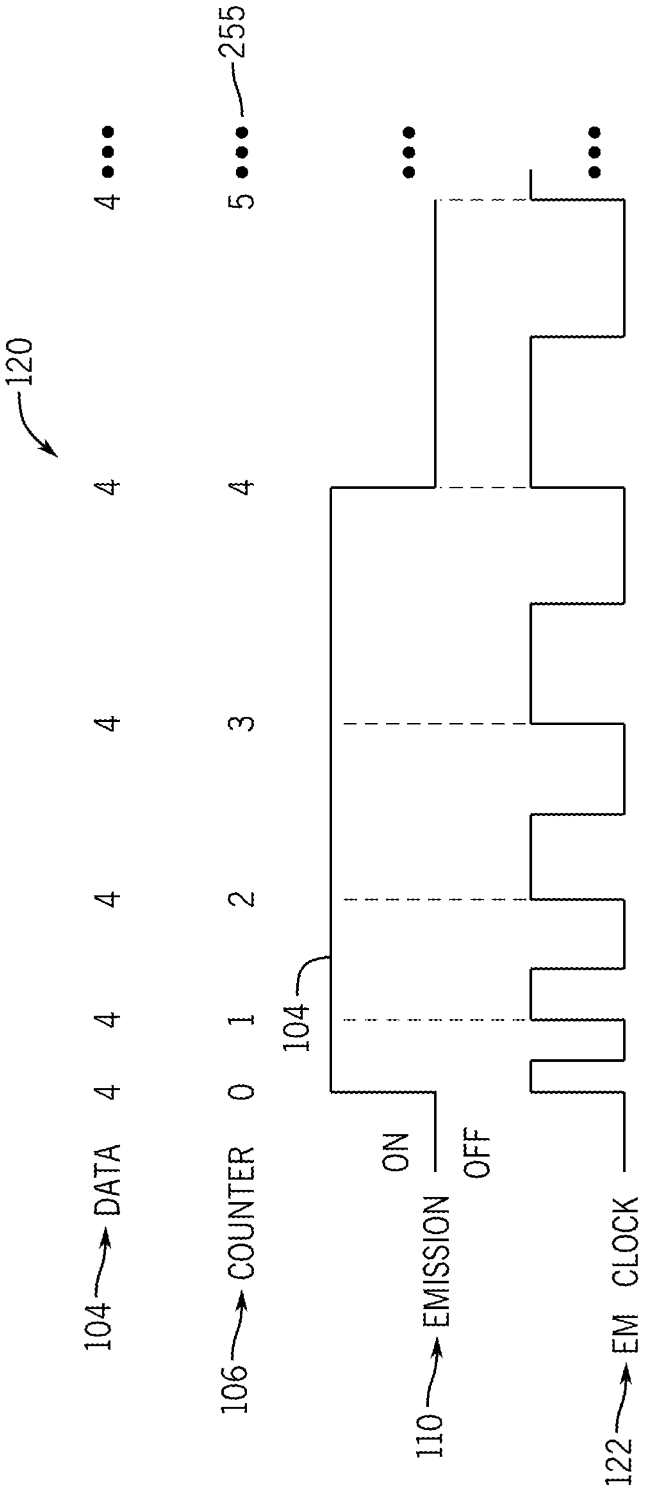
FIG. 9 is a timing diagram illustrating an example operation of the micro-driver of FIG. 8, in accordance with an embodiment of the present disclosure.

A timing diagram 120, shown in FIG. 9, provides one brief example of the operation of the micro-driver 78. The timing diagram 120 shows the digital data signal 104, the digital counter signal 106, the emission control signal 110, and the emission clock signal (EM_CLK) represented by numeral 122. In the example of FIG. 9, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the digital data signal 104. When the digital counter signal 106 reaches the digital data signal 104, the comparator 108 outputs the emission control signal 110 to an "off" state, thereby causing the selected display pixel 77 no longer to emit light.

It should be noted that the steps between gray levels are reflected by the steps between emission clock signal (EM_CLK) edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 77 being driven.

Figure 10:
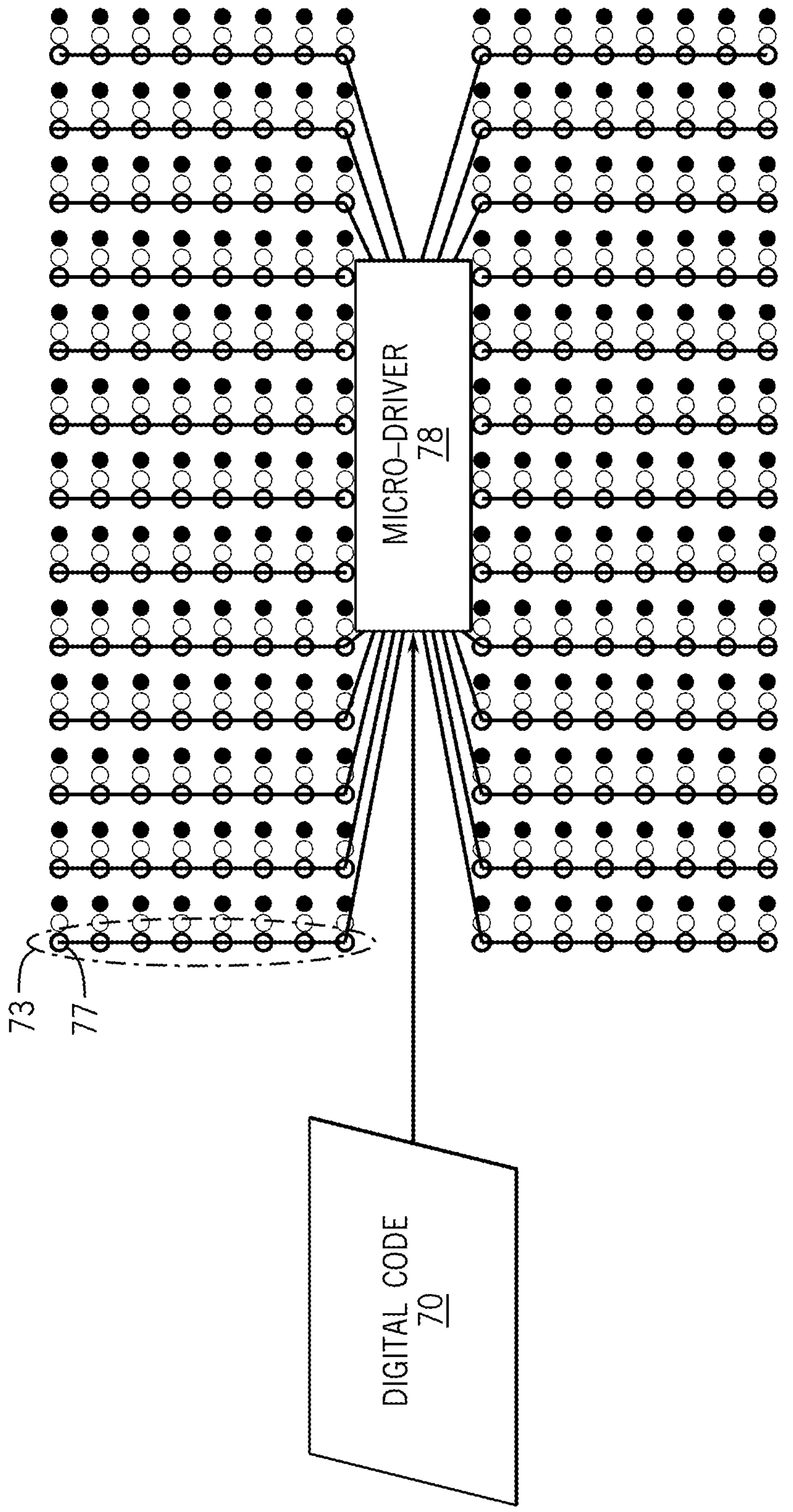
FIG. 10 is a schematic illustration of the micro-LED display of FIG. 7, where a micro-driver controls a collection of display pixels based on a digital code, in accordance with an embodiment of the present disclosure.

With the preceding in mind, FIG. 10 illustrates the micro-driver 78 driving the display pixels 77 according to the image data 70 in the form of a digital code, and thereby enabling image content to be displayed by the micro-LED display 12. As mentioned above, the micro-driver 78 may drive any suitable number of display pixels 77, and a subset of display pixels 77 may be located on respective anodes 73 of the micro-LED display 12. As illustrated, the subset of display pixels 77 located on each anode 73 may be associated with a particular color (e.g., red, green, blue). Further, it should be noted that a respective cathode corresponds to a subset of display pixels 77 associated with a particular color even though each cathode for a particular color channel is not illustrated in FIG. 10. For example, as illustrated, a first set of cathodes corresponds to a red color channel (e.g., subset of red display pixels 77). However, there may be a second set of cathodes that couple to a green color channel (e.g., subset of green display pixels 77) and a third set of cathodes that couple to a blue color channel (subset of blue display pixels 77). The second set of cathodes and the third set of cathodes are not expressly illustrated in FIG. 10 for ease of illustration.

As discussed with respect to FIG. 7, the display pixels 77 may be arranged as an LPM. As illustrated, the micro-driver 78 may drive two LPMs of display pixels 77. Each LPM may include twenty-six anode groups 73 having eight display pixels 77 each. It may be understood that each micro-driver 78 may drive more or fewer anode groups 73 and respective display pixels 77. As illustrated, the subset of display pixels 77 located on each anode group 73 may be associated with a particular color (e.g., red, green, blue). As mentioned above, it should be noted that a respective cathode corresponds to a subset of display pixels 77 associated with a particular color even though each cathode for a particular color channel is not illustrated in FIG. 10. For example, anode 74 corresponds to a red color channel (e.g., subset of red display pixels 77) and there may be a corresponding shared cathode for all color channels or a separate cathode corresponding to the red color channel. There are a second set of anodes that couple to a green color channel (e.g., subset of green display pixels 77) and a third set of anodes that couple to a blue color channel (subset of blue display pixels 77), but these are not expressly illustrated in FIG. 10 for ease of description. Each micro-driver 78 may drive one row of display pixels 77 of each LPM at a time.

Figure 11:
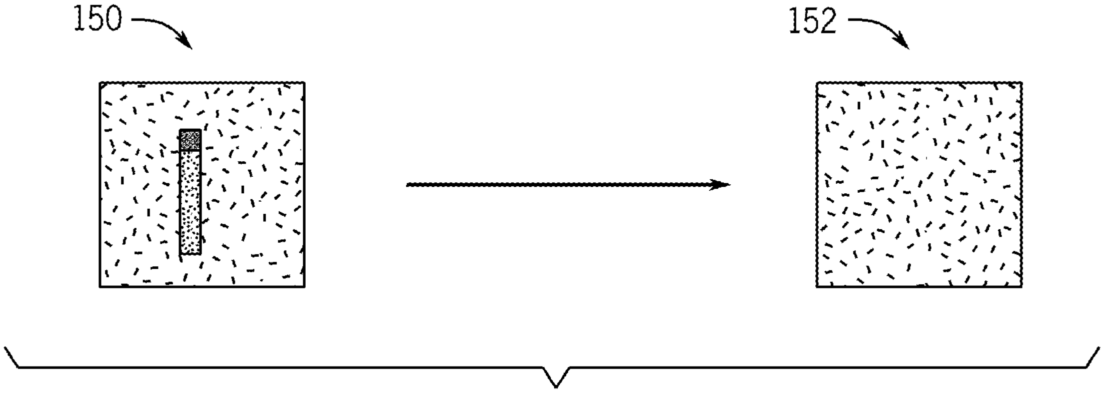
FIG. 11 is a schematic illustration depicting an image artifact that is less visible on the micro-LED display of FIG. 7 after mitigation, in accordance with an embodiment of the present disclosure.

In some cases, image content displayed on the micro-LED display 12 may include image artifacts, such as a dark display pixels and/or black display pixels due to a failed (e.g., defective, malfunctioning) micro-LED. FIG. 11 is a schematic illustration depicting an image artifact that is less visible on the micro-LED display 12 after applying a sensing/compensation scheme. In particular, FIG. 11 illustrates image content 150 before applying mitigation and image content 152 after applying the mitigation. As discussed herein, different display pixels 77 may include different colored micro-LEDs to represent the image data 64 in RGB format. Without applying the sensing/compensation scheme, image artifacts due to failed micro-LEDs, such as darker display pixels could appear when image content 150 is displayed on the micro-LED display 12. For example, a failed micro-LED may not emit light, which may result in display pixel displaying a gray level 0 (black). However, the failed micro-LED may continue to draw current away from other micro-LEDs along the same anode. The other micro-LEDs may receive less current than intended and emit less light (e.g., lower luminance) in comparison to a target luminance level within image data. As such, the image content 150 may appear with a display pixel at gray level 0 corresponding to the failed micro-LED and a column of darker display pixels (e.g., lower gray level than the target gray level in the digital code 70) corresponding to the other micro-LEDs along the anode. However, after applying the sensing/compensation scheme, the black display pixel and/or the darker display pixels may not be perceivable, as depicted by image content 152. For example, after mitigating (e.g., compensating for) the failed micro-LED, the visibility of the image artifact may be reduced by 50%, 80%, 90%, 100%, and the like. The process for applying the sensing/compensation scheme to identify and/or mitigate a failed micro-LED will be described in greater detail below.

Figure 12:
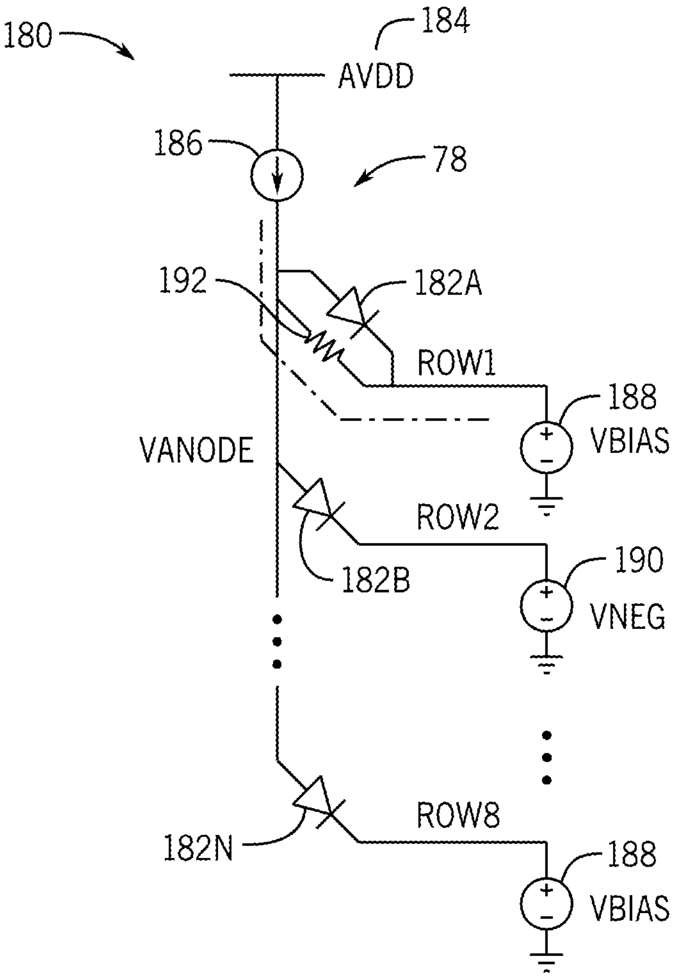
FIG. 12 is a schematic diagram of an embodiment of a local passive matrix anode of the micro-LED display of FIG. 7 with a failed micro-LED, in accordance with an embodiment of the present disclosure.

FIG. 12 is schematic diagram of an embodiment of a local passive matrix anode 180 of the micro-LED display 12 with a failed micro-LED. As discussed herein, an anode 73 may include a subset of display pixels 77 associated with a particular color. The local passive matrix anode 180 may correspond to at least a portion of the anode 73. As illustrated, the local passive matrix anode 180 includes one or more micro-LEDs 182 (illustrated as 182A-182N, collectively referred to as a micro-LED 182) corresponding to the subset of display pixels 77. For example, the local passive matrix anode 180 may include eight micro-LEDs 182. It may be understood that the local passive matrix anode 180 may include any suitable number of micro-LEDs 182 coupled together in parallel, such as 2 or more micro-LEDs, 3 or more micro-LEDs, 4 or more micro-LEDs, 5 or more micro-LEDs, 6 or more micro-LEDs, 7 or more micro-LEDs, 9 or more micro-LEDs, 10 or more micro-LEDs, and so on. As will be described in further detail below, each micro-LED 182 may be part of a respective cathode and/or a cathode circuit corresponding to a respective cathode. For example, a first micro-LED 182A may be part of a first cathode circuit, a second micro-LED 182B may be part of a second cathode circuit, and so on.

The local passive matrix anode 180 may include or be coupled to an analog power supply 184 (AVDD) (e.g., the analog power signal 90 described with respect to FIG. 7) and a current source 186 that drives the micro-LEDs 182 to emit light. For example, the current source 186 may be a component of the micro-driver 78 and/or receive signals from the micro-driver 78 to provide a current to the micro-LEDs 182.

Returning to the micro-LEDs 182, the local passive matrix anode 180 may include the micro-LEDs 182 coupled together in parallel. To display a frame of image content, for example, current may be provided to the first micro-LED 182A to drive the first micro-LED 182A to emit light, then current may be provided to the second micro-LED 182B, then current may be provided to the third micro-LED 182C, and so on. The local passive matrix anode 180 may include a voltage (e.g., anode voltage) that creates a voltage drop across the micro-LEDs 182. The local passive matrix anode 180 may also be coupled to one or more cathodes that may be selectively coupled to bias voltages ($V_{Bias}$) 188 and negative voltages ($V_{Neg}$) 190. It may be understood that each respective cathode may include and/or be coupled to a respective switch that selectively couples the respective cathode to the bias voltage 188 or the negative voltage 190 during operation (e.g., display of image data). For example, a row of micro-LEDs 182 (e.g., along a respective cathode) may be driven when the switch couples the row of micro-LEDs 182 to the negative voltage 190. Each micro-LED 182 may include a turn-on voltage, which may be an amount of voltage used to drive the micro-LED 182 to emit light. If the voltage across the micro-LED 182 is greater than the turn-on voltage, then the micro-LED 182 may be driven to emit light. That is, by coupling the row of micro-LEDs 182 to the negative voltage 190, a voltage drop may be formed and current driven across the row of micro-LEDs 182 may cause the row of micro-LEDs 182 to emit light. The remaining rows of micro-LEDs 182 may be coupled to the bias voltage 188 and may not emit light when current is driven along the anode. The bias voltage 188 may be greater than the negative voltage 190. For example, the bias voltage 188 may be equal to $V_{Neg}$+1.5 Volts (V). In another example, the bias voltage 188 may be equivalent to a voltage of the analog power supply 184.

In certain instances, a micro-LED may fail such that the micro-LED 182 may not be operating and/or functioning as expected. For example, a failed micro-LED may not emit light at an intended brightness. As another example, the failed micro-LED may not emit any brightness or may continue to emit at a brightness level for longer or shorter than an intended time period. The failed micro-LED may draw current intended to go to the other micro-LEDs 182 along the local passive matrix anode 180. As such, the remaining micro-LEDs 182 may receive less current, thus emitting less light or light at lower luminance levels in comparison to the target luminance levels in the digital code 70, which may cause perceivable visual image artifacts in the image content displayed on the micro-LED display 12.

By way of example, the first micro-LED 182A may be a failed micro-LED, while the remaining micro-LEDs 182B-N may be functioning micro-LEDs 182. To illustrate the current drawn by the failed micro-LED in FIG. 12, the first micro-LED 182A is coupled to a resistor 192 in parallel. That is, the current drawn by the failed micro-LED may be equivalent to a resistance of the resistor 192. For example, the micro-driver 78 may drive the second micro-LED 182B to emit light, but the failed micro-LED may draw an amount of current equivalent to the resistance of the resistor 192 and the second micro-LED 182B may receive the remaining amount of current. The remaining amount of current may be less than the amount of current provided by the current source 186 for driving the second micro-LED 182B. In this way, the second micro-LED 182B may receive less current and emit less light. As such, the image content displayed by the micro-LED display 12 may include perceivable image artifacts, such as the image artifacts within the image content 150 described with respect to FIG. 11.

As discussed herein, the failed micro-LED (e.g., the first micro-LED 182A) may not emit light when driven. That is, the failed micro-LED may emit a gray level 0. When the failed micro-LED is continuously driven, the failed micro-LED may experience current stress on and/or additional degradation. As such, identifying and/or mitigating the failed micro-LED may improve operation of the micro-LED display 12 and/or the local passive matrix anode 180.

Figure 13:
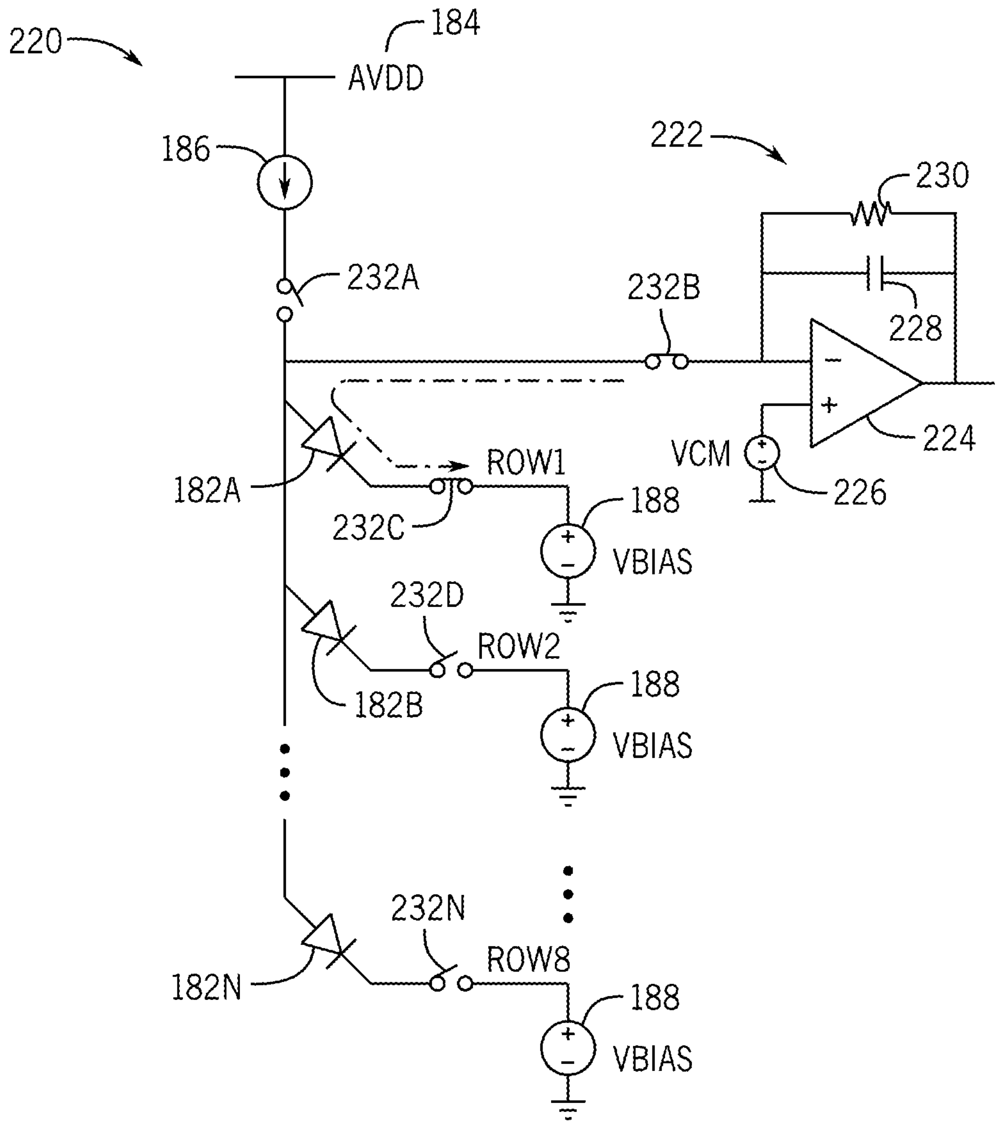
FIG. 13 is a schematic diagram of an embodiment of a local passive matrix anode of the micro-LED display of FIG. 7 coupled to circuitry for identifying a failed micro-LED, in accordance with an embodiment of the present disclosure.

With the foregoing in mind, FIG. 13 is schematic diagram of an embodiment of a local passive matrix anode 220 of the micro-LED display 12 coupled to circuitry (e.g., testing circuitry, sensing circuitry) 222 for identifying (e.g., sensing) a failed micro-LED. As illustrated, the micro-LED display 12 may include circuitry 222 for identifying failed micro-LEDs (e.g., the first micro-LED 182A). The circuitry 222 may individually test the micro-LEDs 182 to identify the failed micro-LEDs. In some cases, the circuitry 222 may be at least partially integrated with touch analog front end (AFE) circuitry used for sensing (e.g., touch sensing) on the micro-LED display 12. In other cases, the circuitry 222 may be at least partially integrated with the micro-driver 78 described with respect to FIGS. 7-10. That is, the circuitry 222 and/or the micro-driver 78 may perform a sensing scheme to identify a failed micro-LED. In other instances, the circuitry 222 and the micro-driver 78 may be separate components within the micro-LED display 12. The sensing scheme may be performed during manufacturing and/or in the field to identify the failed micro-LEDs. In addition, the sensing scheme may be periodically performed when the electronic device 10 is within the field to identify micro-LEDs 182 that may become failed micro-LEDs over time.

The local passive matrix anode 220 may include the micro-LEDs 182 connected together in parallel, the analog power supply 184, and/or the current source 186. The local passive matrix anode 220 may be coupled to the circuitry 222 for identifying the failed micro-LED. The circuitry 222 may include an analog opamp 224 (e.g., analog buffer), a common mode bias voltage ($V_{cm}$) 226, a capacitor 228, and a resistor 230. The analog opamp 224 may include a first input (e.g., negative input) coupled to the common mode bias voltage 226 and a second input (e.g., positive input) coupled to a micro-LED 182 being tested. The second input may also be coupled to the capacitor 228 and the resistor 230.

To perform the testing, the analog power supply 184 and/or the current source 186 may be disconnected from the micro-LEDs 182 and the circuitry 222 may be coupled to the micro-LEDs 182. As illustrated, the local passive matrix anode 220 may include one or more switches 232 (illustrated as 232A-232N, collectively referred to as a switch 232) coupled to the micro-LEDs 182, the current source 186, the circuitry 222, and the like. The switches 232 may be controlled by the circuitry 222, the micro-driver 78, and/or the processor core complex 18. At the start of the sensing scheme, a first switch 232A may open to disconnect the analog power supply 184 and/or the current source 186 from the micro-LEDs 182, a second switch 232B may close to couple the circuitry 222 to the micro-LEDs 182, and/or a third switch 232C may selectively couple the first micro-LED 182A to the bias voltage 188, a fourth switch 232D may selectively couple the second micro-LED 182B to the bias voltage 188, and so on. To test the first micro-LED 182A, for example, the third switch 232C may close to couple the first micro-LED 182A to the bias voltage 188. The remaining switches 232 (e.g., switches 232D-N) may be open to disconnect the bias voltage 188 from the remaining micro-LEDs 182B-N. After testing the first micro-LED 182A, the third switch 232C may open and the fourth switch 232D may close to couple the second micro-LED 182B to the bias voltage 188 and test the second micro-LED 182B. This process may continue and/or repeat until all micro-LEDs 182 along the local passive matrix anode 220 may be tested by the circuitry 222. As such, the circuitry 222 may individually test each micro-LED 182 of the local passive matrix anode 220, and moreover, each micro-LED 182 within the micro-LED display 12. As such, failed micro-LEDs 182 may be identified.

If the first micro-LED 182A is a failed micro-LED, for example, the analog opamp 224 may receive a current from the first micro-LED 182A during the sensing scheme. The analog opamp 224 may convert the current into an analog voltage and output the analog voltage. In other words, the analog opamp 224 may output an analog voltage representation of micro-LED leakage current, which may indicate that the first micro-LED 182A may have failed (e.g., malfunction). If the analog opamp 224 does not receive a current from the first micro-LED 182A during the testing (e.g., sensing scheme), then the first micro-LED 182A may be determined to be a functional micro-LED. In this way, the analog opamp 224 may operate as a trans-impedance amplifier (TIA). In certain instances, the analog opamp 224 may be coupled to an analog-to-digital converter to digitize the output analog voltage.

If the first micro-LED 182A is a failed micro-LED, the circuitry 222 may identify a position of the first micro-LED 182A (e.g., along the respective anode and/or the respective cathode) within the micro-LED display 12. The circuitry 222 may provide an indication of the position of the first micro-LED 182A to the processor core complex 18 and/or processing circuitry. The processor core complex 18 may adjust the image data based on the position of the first micro-LED 182A to reduce or eliminate perceivable visual image artifacts.

Figure 14:
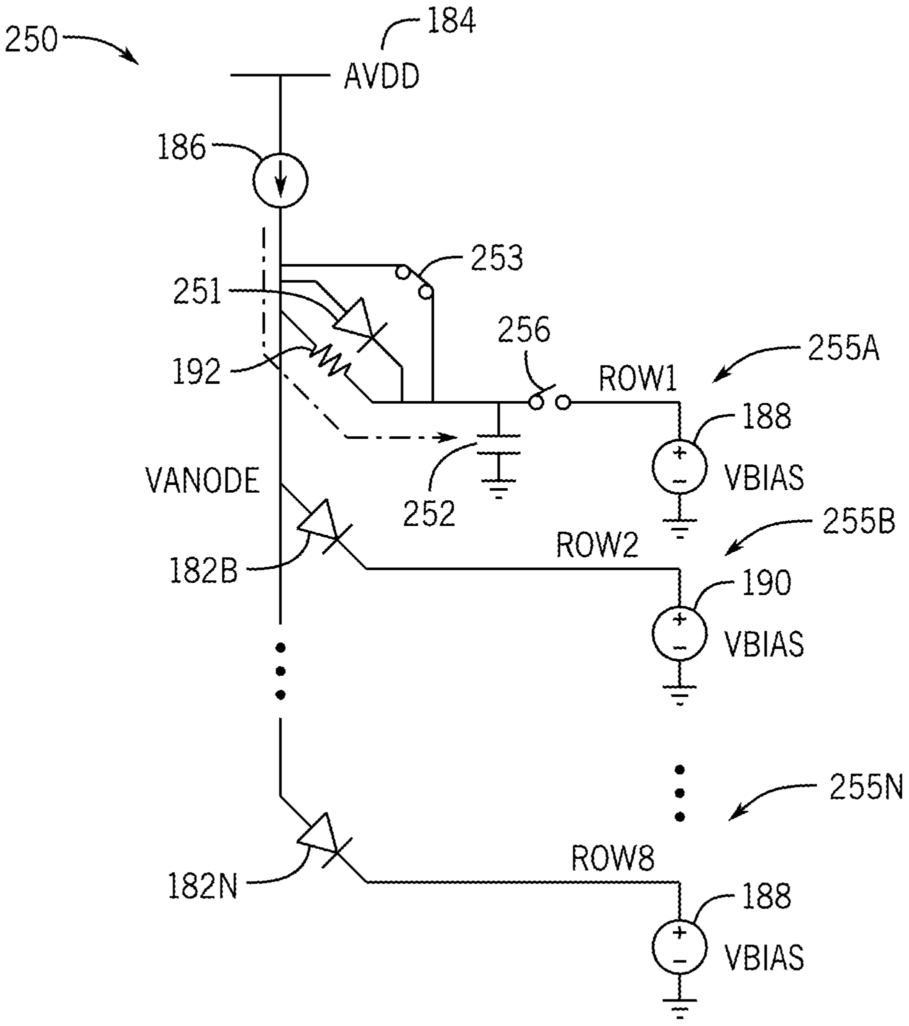
FIG. 14 is a schematic diagram of an embodiment of a local passive matrix anode of the micro-LED display of FIG. 7 for mitigating a failed micro-LED, in accordance with an embodiment of the present disclosure.

FIG. 14 is a schematic diagram of a local passive matrix anode 250 of the micro-LED display 12 for mitigating (e.g., compensating) a failed micro-LED 251. The local passive matrix anode 250 may include the micro-LEDs 182 connected together in parallel, the analog power supply 184, and/or the current source 186. As discussed herein, the sensing scheme may identify failed micro-LEDs 251 and a compensation scheme may mitigate for the failed micro-LEDs 251, thereby reducing or eliminating perceivable visual image artifacts within image content being displayed.

By way of illustrative example, the first micro-LED 182A may be a failed micro-LED 251. To illustrate the failure, the local passive matrix anode 250 includes a resistor 192 coupled in parallel to the first micro-LED 182A. The failed micro-LED 251 may draw current equivalent to a resistance of the resistor 192. That is, the failed micro-LED 251 may include a defined resistance (e.g., resistor). Additionally or alternatively, a cathode coupled to the failed micro-LED 251 may include a parasitic capacitance as illustrated by a capacitor 252.

To mitigate the failed micro-LED 251, the local passive matrix anode 180 may include a shunt switch 253 coupled to the failed micro-LED 251 in parallel. The shunt switch 253 may include a defined resistance with a defined value that therefore draws a defined short circuit current. As such, the shunt switch 253 may provide a low resistance path for the current. That is, the current flows through the shunt switch 253 instead of the failed micro-LED 251. Although the illustrated example of the local passive matrix anode 180 includes the shunt switch 253 coupled to the failed micro-LED 251, it may be understood that a respective shunt switch 253 may be coupled to each micro-LED 182B-N in parallel. For the micro-LEDs 182B-N, the respective shunt switches 253 may be open to cause the current to flow across the micro-LEDs 182B-N. If one of the micro-LEDs 182B-N may be identified as a failed micro-LED 251, the respective shunt switch 253 may close to cause the current to be shunted around the failed micro-LED 251. As such, current drawn by the failed micro-LED 251 may be reduced or eliminated, thereby mitigating for the failed micro-LED 251.

The local passive matrix anode 250 may be coupled to one or more cathode circuits 255 (illustrated as 255A-N, collectively referred to herein as a cathode circuit 255). The cathode circuit 255 may include at least a portion of the cathode. In certain instances, a respective cathode with the failed micro-LED 251 may be pre-charged and/or floated to reduce or eliminate current flow to the failed micro-LED 251. For example, the cathode circuit 255 may include a pre-charge switch 256 (e.g., the third switch 232C, the remaining switches 232D-N) respectively coupled between a micro-LED 182 and the bias voltage 188 and/or the negative voltage 190. The pre-charge switch 256 may selectively couple the first micro-LED 182A to the bias voltage 188 and/or the negative voltage 190. For example, the cathode circuit 255 may be pre-charged to a pre-charge voltage ($V_{pch}$), which may be equivalent to a voltage of the local passive matrix anode 250. By pre-charging the cathode circuit 255 coupled to the failed micro-LED 251, the current drawn by the failed micro-LED 251 may be reduced or eliminated. During operation, for example, the micro-driver 78 may drive a first row of micro-LEDs 182 coupled to a first cathode circuit 255A to emit light and pre-charge a second row of micro-LEDs 182 coupled to a second cathode circuit 255B. The micro-driver 78 may drive the second row of micro-LEDs 182 using the pre-charged voltage prior to driving the second row of micro-LEDs 182 using the current source 186.

The compensation scheme may include increasing emission time and/or a duty cycle of the remaining micro-LEDs 182B-182N. For example, increasing emission time may cause the micro-LED 182 to emit light for a longer period of time, which may increase brightness. In another example, increasing the duty cycle of the micro-LED 182 may increase an amount of time the micro-LED 182 is on. The duty cycle may refer to a ratio between the time where the micro-LED 182 is on (e.g., emitting light) and the time where the micro-LED 182 is off (e.g., not emitting light). The longer a micro-LED 182 is on, the more light the micro-LED 182 may emit and the brighter the micro-LED 182 may visually appear to be. By increasing the brightness of the remaining micro-LEDs 182B-182N, the visual appearance of the failed micro-LED 251 may be reduced or eliminated. As such, perceivable image artifacts due to the failed micro-LED 251 may be reduced or eliminated.

Additionally or alternatively, the compensation scheme may include driving the local passive matrix anode 250 with increased current. That is, each of the micro-LEDs 182 coupled to the local passive matrix anode 250 may receive increased current including the failed micro-LED 251. As discussed herein, the shunt switch 253 coupled to the failed micro-LED 251 may include a defined resistor having defined value. Therefore, the current being drawn by the shunt switch 253 may be defined (e.g., known) by the micro-driver 78. In other words, the shunt switch 253 may draw a defined short circuit current. The current drawn by the shunt switch 253 may be compensated for by increasing the overall current provided to the local passive matrix anode 250. As the current is driven through the local passive matrix anode 250, an amount may be drawn by the shunt switch 253 and the remaining amount may be used to drive a respective micro-LED 182 coupled to the local passive matrix anode 250. The remaining amount may correspond to an amount of current intended to drive the respective micro-LED 182 to emit light at a target luminance level. Although the micro-LED display 12 may consume more power to compensate for the failed micro-LED, the visibility of perceivable image artifacts within image content displayed on the micro-LED display 12 may be reduced or eliminated.

In certain instances, a failed micro-LED 251 may stop failing, if current and/or voltage stress across the failed micro-LED 251 may be reduced or eliminated. That is, in certain instances, reducing or eliminating current flow and/or voltage across the failed micro-LED 251 may mitigate (e.g., fix) failed micro-LED 251. For example, the bias voltage 188 may be adjusted to reduce or eliminate a magnitude and/or a polarity of voltage stress exerted on the failed micro-LED 251. In another example, the image data corresponding to the failed micro-LED 251 may be set to a gray level 0 (black), thereby reducing current stress on the failed micro-LED 251. Still in another example, coupling the cathode circuit 255 with the failed micro-LED 251 to a higher bias voltage 188 may reduce voltage stress on the failed micro-LED 251 by reducing voltage flow across the failed micro-LED 251.

Figure 15:
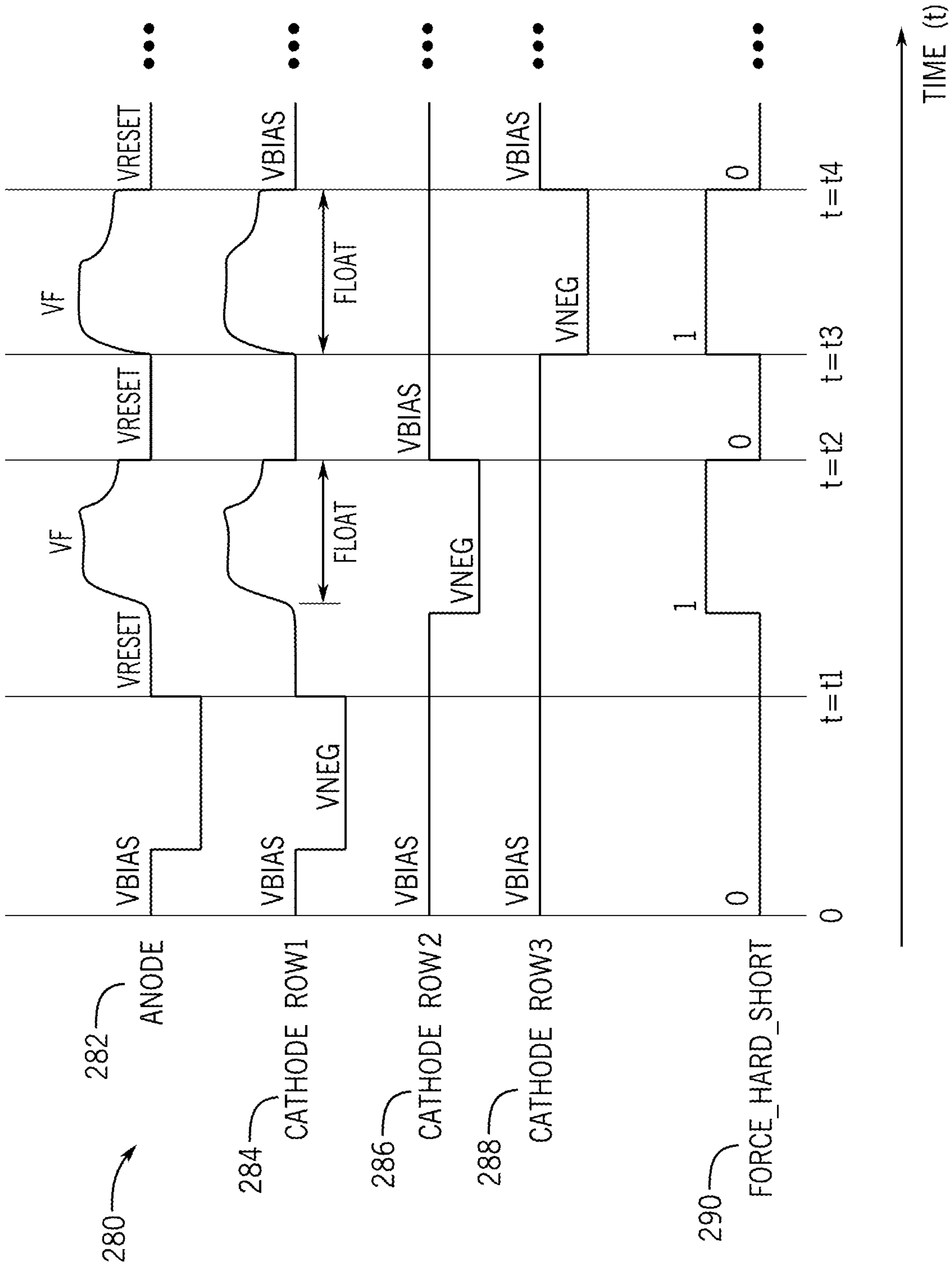
FIG. 15 is a timing diagram illustrating voltage levels of an anode, a first cathode, a second cathode, a third cathode, and logic control voltage of the micro-LED display of FIG. 7 during the mitigation scheme of FIG. 14, in accordance with an embodiment of the present disclosure.

FIG. 15 is a timing diagram 280 illustrating voltage levels of an anode 282 (e.g., the local passive matrix anode 250 described with respect to FIG. 14), a first cathode 284 (e.g., the cathode circuit 255 described with respect to FIG. 14), a second cathode 286, a third cathode 288, and a logic control voltage 290 (e.g., the logic control voltage of the shunt switch 253 described with respect to FIG. 14) during the mitigation scheme of FIG. 14. The voltage level of the first cathode 284 may correspond to a voltage level of a first row of micro-LEDs 182 including the failed micro-LED 251, the voltage level of the second cathode 286 may correspond to a voltage level of a second row of micro-LEDs 182 including the second micro-LED 182B, and so on. The timing diagram 280 may be used to describe the voltage changes of the components within the local passive matrix anode 250 and/or the cathode circuit 255 described with respect to FIG. 14. For example, the anode 282 may correspond to the local passive matrix anode 250 with the failed micro-LED 251 and the first cathode 284 may correspond to a first cathode circuit 255 with the failed micro-LED 251 and the shunt switch 253 described with respect to FIG. 14.

At time t=0, the anode 282 may be at a reset voltage and each of the cathodes 284, 286, 288 may be set to a bias voltage. The micro-LEDs 182 may not emit light when a respective cathode is set to the bias voltage. To drive a cathode 284, 286, 288 to emit light, the cathode 284, 286, 288 may be set to a negative voltage. For example, at a time between t=0 and t=t1, the first cathode 284 may be set to the negative voltage. As such, current from the anode 282 may drive the micro-LEDs 182 within the first cathode 284 to emit light.

After the micro-LEDs 182 within the first cathode 284 is driven, at time t=t1 the first cathode 284 may be set to the bias voltage and the anode 282 may be set to the reset voltage. The first cathode 284 may be pre-charged with a voltage corresponding to the voltage of the anode 282. For example, the first cathode 284 may be "floated," or a capacitor within the first cathode 284 may store a pre-charge voltage. The pre-charge voltage may be equivalent to the voltage of the anode 282. As such, the logic control voltage 290 may be pulled to a logic high ("1"). At a logic high, a biased cathode may draw current from the failed micro-LED 251, thereby reducing and/or eliminating current draw by the failed micro-LED 251. In addition, the biased cathode may be floated at the logic high. The anode 282 may also be pre-charged with a voltage. While the first cathode 284 may be floating, the second cathode 286 may be driven to emit light. For example, the second cathode 286 may be set to the negative voltage and current from the current source 186 may be used to drive the micro-LEDs 182 within the second cathode 286.

At time t=t2, the anode 282 may be set to the reset voltage and each of the cathodes 284, 286, and 288 may be set to the bias voltage. The logic control voltage 290 may be pulled to a logic low ("0") in response to driving the second cathode 286 not emitting light.

At time t=t3, the third cathode 288 may be driven to emit light. To this end, the third cathode 288 may be set to the negative voltage. While the third cathode 288 may be driven to emit light, the first cathode 284 may be pre-charged to reduce or eliminate current draw by the failed micro-LED 251. The logic control voltage 290 may be pulled to a logic high ("1") in response to pre-charging the first cathode 284. As illustrated, the first cathode 284 may be pre-charged and floated to reduce or eliminate current draw by the failed micro-LED 251. The logic control voltage 290 may be pulled to a logic high in response to floating the first cathode. As illustrated in FIG. 15, the first cathode 284 may be floating at time t=t3 to time t=t4. Since the second cathode 286 may not be driven to emit light, the second cathode 286 may be set to the bias voltage.

At time t=t4, the anode 282 may be set to the reset voltage and each of the cathodes 284, 286, and 288 may be set to the bias voltage and the logic control voltage 290 may be pulled to a logic low ("0").

Figure 16:
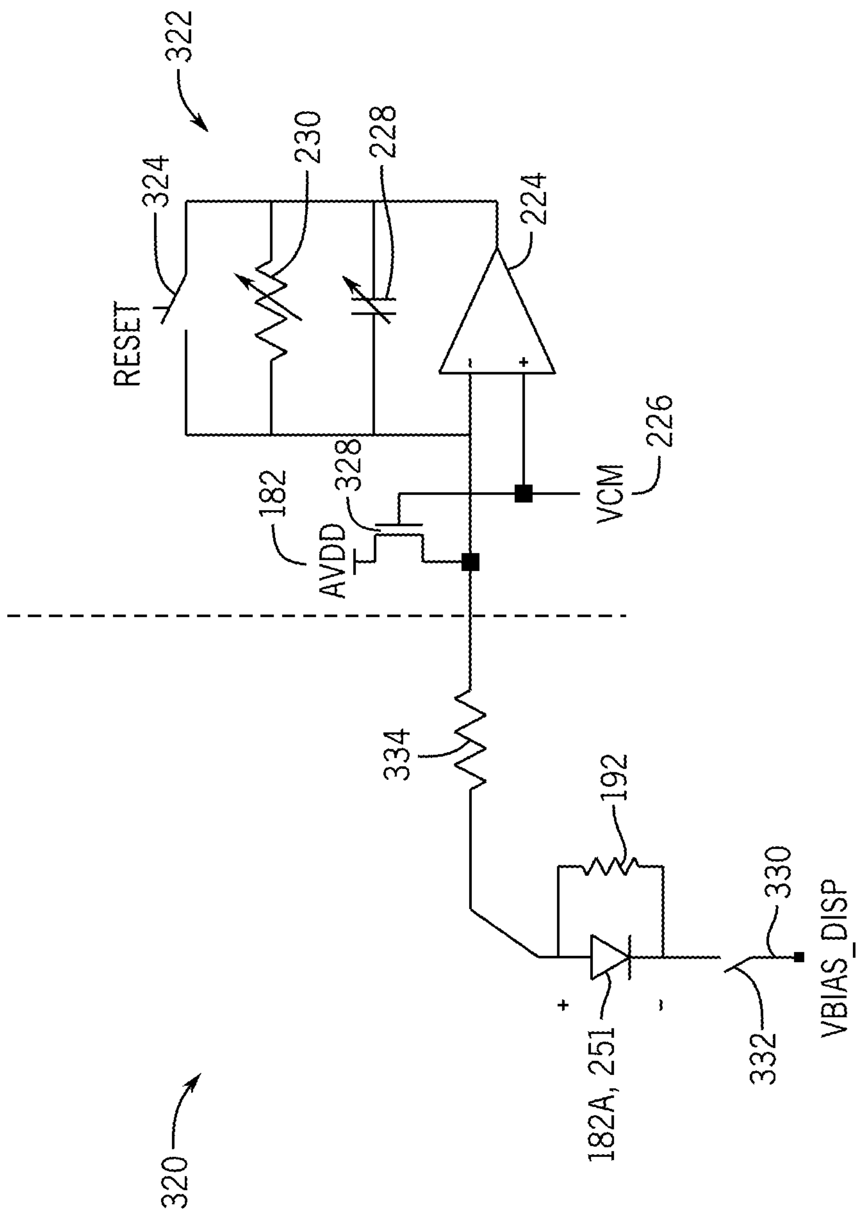
FIG. 16 is a schematic diagram of an embodiment of a local passive matrix anode coupled to circuitry to implement a sensing scheme to identify a failed micro-LED of the micro-LED display of FIG. 7, in accordance with an embodiment of the present disclosure.

FIG. 16 is a schematic diagram of an embodiment of a local passive matrix anode 320 coupled to the circuitry 322 (e.g., the circuitry 222 described with respect to FIG. 13) to implement the sensing scheme to identify the failed micro-LED 251. The circuitry 322 may use current sensing to identify the failed micro-LED 251, where the current may be a direct current. In the illustrated example, the circuitry 322 includes the analog opamp 224, the capacitor 228, and the resistor 230. The analog opamp 224 may include a first input coupled to the micro-LEDs 182 and a second input coupled to the common mode bias voltage ($V_{cm}$) 226. The output of the analog opamp 224 may be an analog voltage representative of micro-LED leakage current. That is, the sum of the capacitance of the capacitor 228 and the resistance of the resistor 230 may be equivalent to the common mode bias voltage 226 received by the analog opamp 224. The circuitry 322 may also include a reset switch 324 that opens and/or closes to reset a voltage of the analog opamp 224. For example, the reset switch 324 may initialize the bias voltage on the negative input of the analog opamp 224 before the start of the sensing scheme.

The local passive matrix anode 320 may include the analog power supply (AVDD) 184 and the first micro-LED 182A, which is illustrated as a failed micro-LED 251 by the resistor 192 coupled in parallel to the first micro-LED 182A. It may be understood that the resistance of a failed micro-LED 251 may be less than the resistance of a functional micro-LED. As such, a failed micro-LED 251 may draw current away (e.g., current leakage) from other micro-LEDs 182B-N along the local passive matrix anode 320.

In the illustrated embodiment, the circuitry 322 may detect the failed micro-LED 251 using an anode-side sensing scheme. For example, the reset switch 324 may open to couple the circuitry 322 to the micro-LEDs 182A-N along the local passive matrix anode 320. As such, the voltage of the local passive matrix anode 320 may be equivalent to the common mode bias voltage 226. In certain instances, the bias display voltage 330 may be equivalent to the bias voltage 188 described with respect to FIGS. 12-14. The bias display voltage 330 may be coupled to a micro-LED 182 that may be tested by the circuitry 322 via a bias voltage switch 332. That is, the voltage of the cathode coupled to the tested micro-LED 182 may be equivalent to the bias display voltage 330. In this way, the forward bias voltage of the tested micro-LED 182 may be controlled by the bias display voltage 330 and the bias voltage switch 332.

The analog opamp 224 may receive a current from the first micro-LED 182A via the second input. The analog opamp 224 may convert the current into an analog voltage, and in certain instances. If a tested micro-LED 182 is a failed micro-LED 251, the analog opamp 224 may receive a current from the tested micro-LED 182 and output an analog voltage representative of the current leakage from the failed micro-LED 251. If the tested micro-LED 182 is a functional micro-LED, the analog opamp 224 may not receive a current from the tested micro-LED 182 and may not output an analog voltage.

The circuitry 322 may include a virtual ground clamp 328 protect the circuitry 322 from over-voltage stress in the event of micro-LED failure (e.g., micro-LED shorting). When the cathode is connected to a bias display voltage 330 and/or a bias voltage switch 332, a virtual ground clamp 328, the resistor 334 may limit the amount of current going to the sensing circuit, thereby reducing the voltage stress on the circuitry 322 and protecting the circuitry 322. The virtual ground clamp 328 may be an NMOS transistor and may be coupled to the third resistor 334 in series to reduce or eliminate current flow to the circuitry 322. A first node of virtual ground clamp 328 may be coupled to the analog power supply (AVDD) 184, a second node of the virtual ground clamp 328 may be coupled to a first input of the analog opamp 224, and a gate of the virtual ground clamp 328 may be coupled to the common mode bias voltage ($V_{cm}$) 226.

As illustrated by the sensing scheme of FIG. 16, the local passive matrix anode 320 may be virtually grounded and a cathode coupled to a micro-LED 182 being tested by the circuitry 322 may be connected to the bias display voltage 330. In certain instances, coupling the cathode to a low impedance, such as the bias display voltage 330, may reduce or eliminate settling issues.

Figure 17:
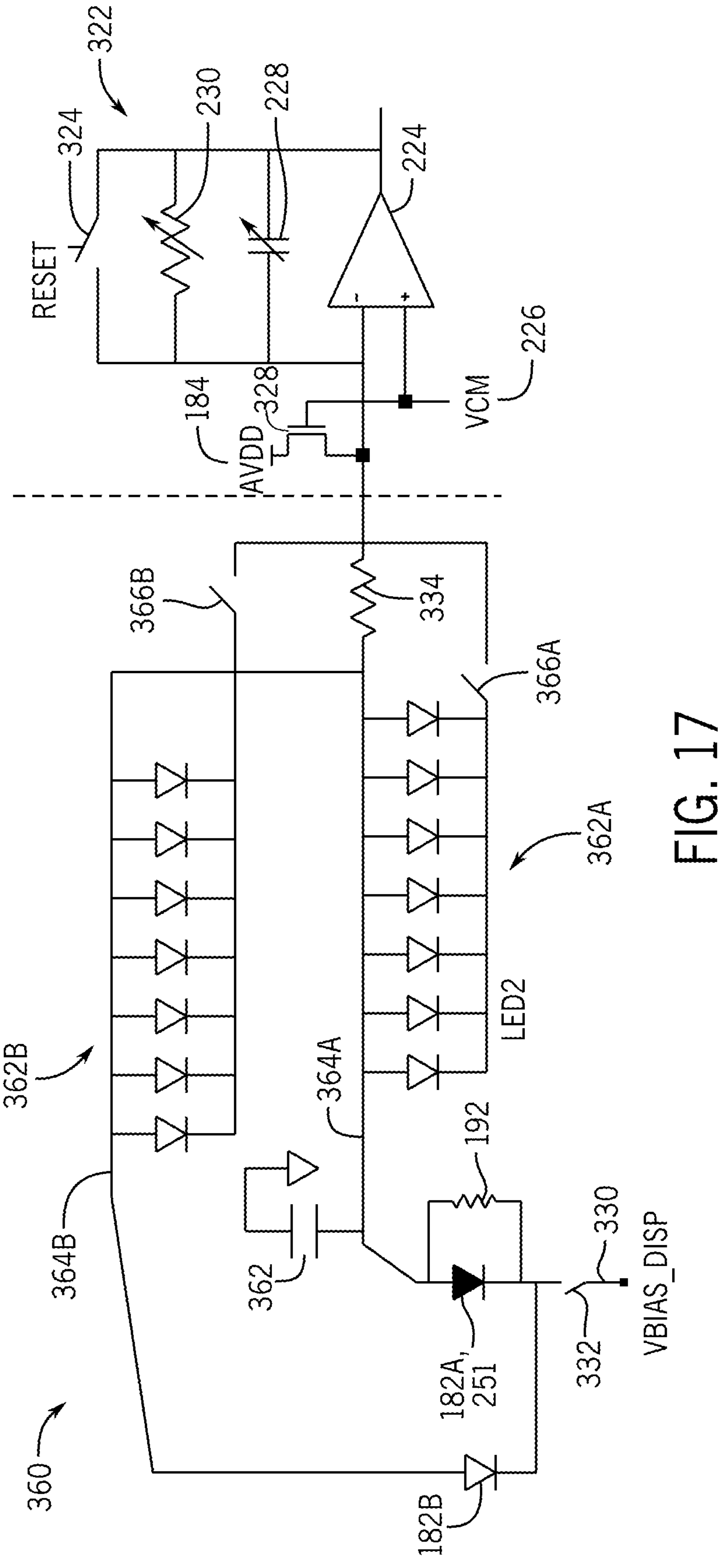
FIG. 17 is a schematic diagram of an embodiment of the local passive matrix anode coupled to circuitry to implement a sensing scheme to identify a failed micro-LED of the micro-LED display of FIG. 7, in accordance with an embodiment of the present disclosure.

FIG. 17 is a schematic diagram of an embodiment of the local passive matrix anode 360 coupled to the circuitry 322 to implement the sensing scheme to identify a failed micro-LED 251 of the micro-LED display 12. In particular, FIG. 17 is intended to illustrate anode and cathode connections used to implement the sensing scheme disclosed herein. For example, FIG. 17 includes a first set of micro-LEDs 362A coupled to a first anode 364A and a second set of micro-LEDs 362B coupled to a second anode 364B. The first set of micro-LEDs 362A may include the first micro-LED 182A. The local passive matrix anode 360 may also include a second set of micro-LEDs 362B with the second micro-LED 182B. The second anode 364B may be coupled to a second cathode switch 366B that couples and/or disconnects the second anode 364B to the first input of the analog opamp 224.

To test the micro-LEDs 182 along the local passive matrix anode 360, both the first cathode switch 366A and the second cathode switch 366B may close. In this way, the untested micro-LEDs 182 may be bootstrapped to the sensing circuitry input voltage. Additionally or alternatively, the first input of the analog opamp 224 may be coupled to the micro-LEDs 182 along the local passive matrix anode 360. To select a respective micro-LED 182 along the local passive matrix anode 360, the bias voltage switch 332 may close to couple the respective micro-LED 172 to the bias display voltage 330. The remaining micro-LEDs 182 along the local passive matrix anode 360 may not be coupled to the bias display voltage 330 via respective bias voltage switches 332 coupled to the respective cathodes. As such, the analog opamp 224 may receive a voltage from the micro-LED 182 coupled to the bias voltage 188 to determine if the micro-LED 182 is a failed micro-LED 251 or a functional micro-LED.

As discussed herein, the circuitry 322 may include the virtual ground clamp 328 and the resistor 334 to limit the amount of current received by the circuitry 322. For example, the virtual ground clamp 328 may conduct if the current from the failed micro-LED 251 exceeds a threshold current.

Figure 18:
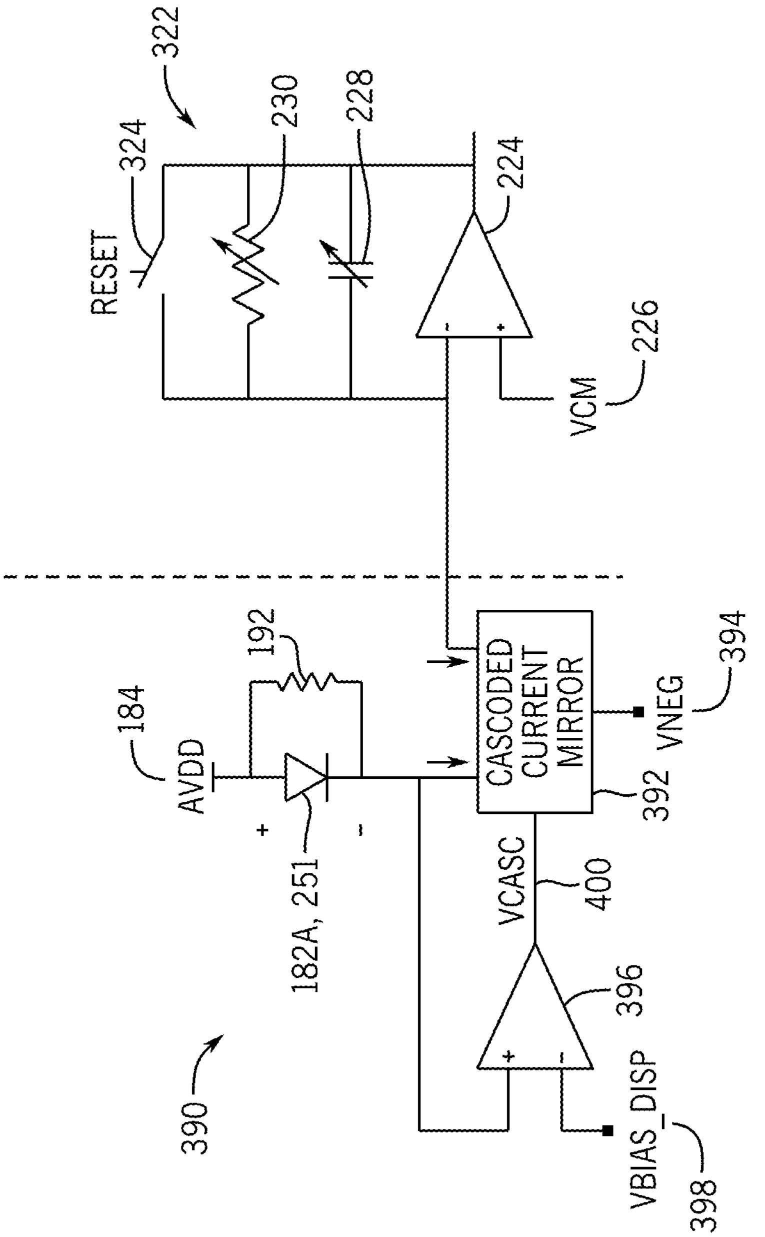
FIG. 18 is a schematic diagram of an embodiment of the local passive matrix cathode coupled to circuitry to implement a sensing scheme to identify a failed micro-LED of the micro-LED display of FIG. 7, in accordance with an embodiment of the present disclosure.

FIG. 18 is a schematic diagram of an embodiment of the local passive matrix cathode 390 coupled to the circuitry 322 to implement the sensing scheme to identify a failed micro-LED 251 of the micro-LED display 12. That is, FIG. 18 illustrates a cathode sensing scheme that may be used, in certain embodiments, in at least part of the sensing scheme. The circuitry 322 may use current sensing to identify a failed micro-LED 251, where the current may be a direct current. Although not illustrated in FIG. 18, the circuitry 322 may include a virtual ground clamp 328 to limit the amount of current received by the circuitry 322.

The cathode sensing scheme may include a cascoded current mirror 392 that receives a current from a tested micro-LED 182. The cascoded current mirror 392 may include a first input coupled to the tested micro-LED 182 and a second input coupled to the first input of the analog opamp 224. If the tested micro-LED 182 is a failed micro-LED 251, the cascoded current mirror 392 may receive current going across the failed micro-LED 251. Additionally or alternatively, the cascoded current mirror 392 may receive a cascode voltage 400 from a second analog opamp 396 for comparison with the common mode bias voltage 226. As illustrated, the second analog opamp 396 may include a first input coupled to a voltage output of a respective micro-LED 182 being tested, a second input coupled to a bias display voltage 398, and an output equivalent to a cascode voltage 400. The output of the second analog opamp 396 may be used to set the cathode voltage of the micro-LED 182 to a desired voltage equivalent to the bias display voltage 398. The cascode voltage 400 may be used as a comparison to determine if the cathode voltage may be equivalent to the bias display voltage 398. If the tested micro-LED is a failed micro-LED 251, the current going into the cascoded current mirror 392 may be reflected to the analog opamp 224. As such, a failed micro-LED 251 may be identified.

Figure 19:
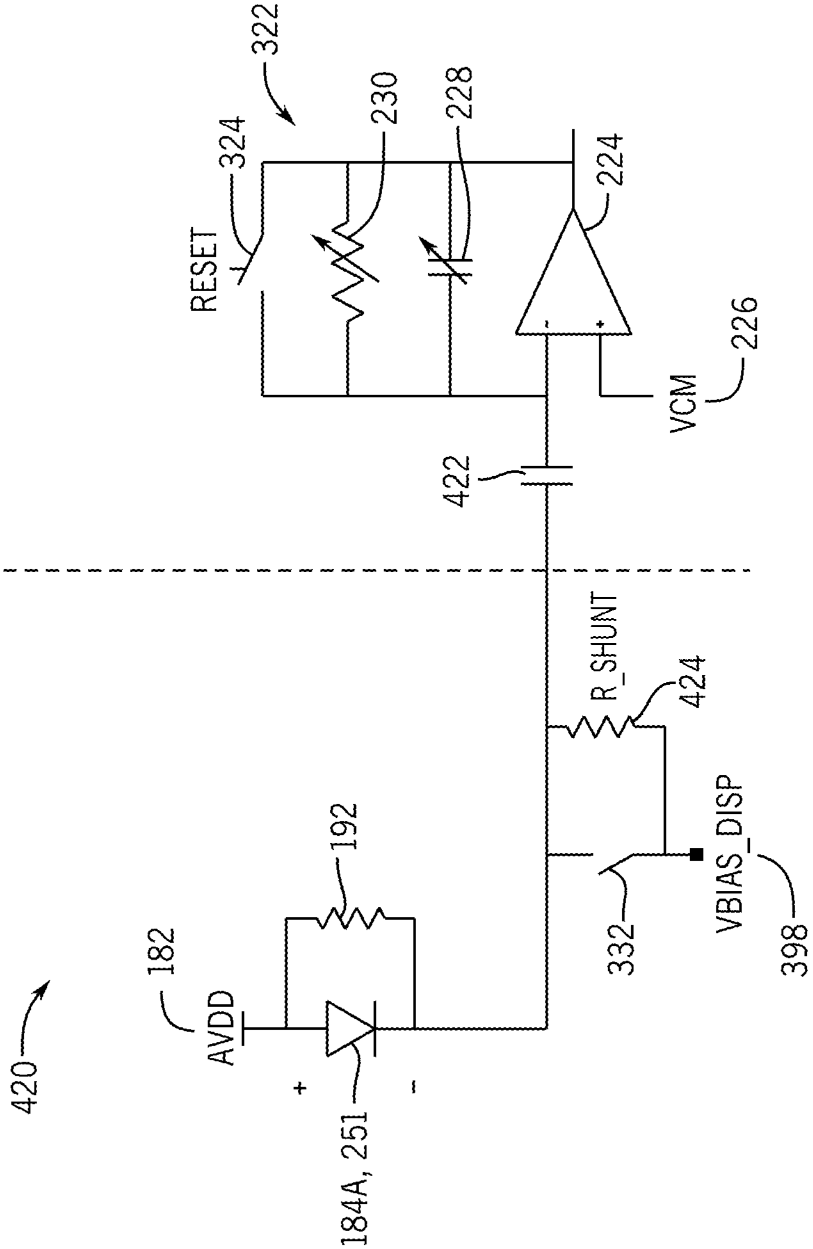
FIG. 19 is a schematic diagram of an embodiment of the local passive matrix cathode coupled to circuitry to implement a sensing scheme to identify a failed micro-LED of the micro-LED display of FIG. 7, in accordance with an embodiment of the present disclosure.

FIG. 19 is a schematic diagram of an embodiment of the local passive matrix cathode 420 coupled to the circuitry 322 to implement the sensing scheme to identify a failed micro-LED 251 of the micro-LED display 12. The circuitry 322 may use voltage sensing and/or alternating current (e.g., modulation) to identify the failed micro-LED 251. The circuitry 322 may use a cathode sensing scheme to identify the failed micro-LED 251. The local passive matrix cathode 420 may include a shunt 424 coupled to the bias display voltage 398 and the bias voltage switch 332. The shunt 424 may include a resistor coupled in parallel to the bias voltage switch 332. The shunt 424 may provide transient resistor/capacitor settling and may operate periodically. The shunt 424 may divert a portion of the current around it. The bias voltage switch 332 may selectively couple the bias display voltage 330 to the local passive matrix cathode 420 and/or a micro-LED 182 for testing by the circuitry 322.

If the tested micro-LED 182 has failed, closing the bias voltage switch 332 may cause current to flow from the tested micro-LED 182. Additionally or alternatively, voltage may flow until the voltage of the local passive matrix cathode 420 may be equal to the failed micro-LED 251 current multiplied by the resistance value of the shunt 424. The circuitry 322 may receive the current from the tested micro-LED 182 and determine that the tested micro-LED 182 may be a failed micro-LED 251.

The circuitry 322 may include a capacitor 422. The voltage flow caused by the failed micro-LED 251 may be coupled through the capacitor 422 to the analog opamp 224 before the bias voltage switch 332 resets the voltage of the local passive matrix cathode 420 back to the bias display voltage 398. The bias voltage switch 332 may be instructed to open and/or close at a set frequency. The frequency may be determined based on the components of the circuitry 322. For example, the frequency may be based on the resistance of the resistor 230 and/or the capacitance of the capacitor 228. By way of example, a capacitance of the capacitor 228 may be between 1 and 10 picoFarads (pF) and/or a resistance of the resistor 230 may be between 1 and 4 megaohms (M).

As such, the bias voltage switch 332 may modulate the voltage of the local passive matrix cathode 420 during the sensing operation and/or operation of the micro-LED display 12.

Figure 20:
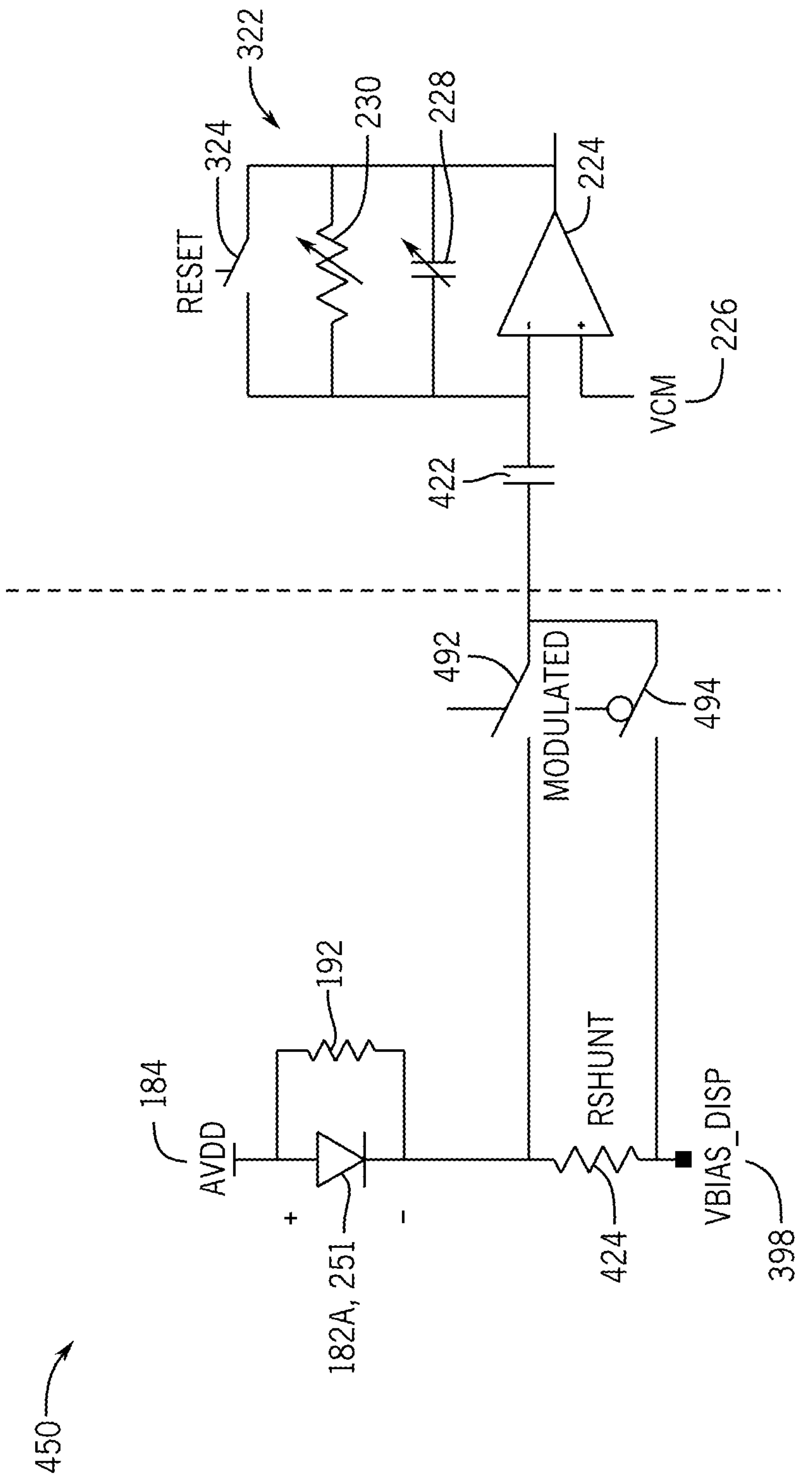
FIG. 20 is a schematic diagram of an embodiment of the local passive matrix cathode coupled to circuitry to implement a sensing scheme to identify a failed micro-LED of the micro-LED display of FIG. 7, in accordance with an embodiment of the present disclosure.

FIG. 20 is a schematic diagram of an embodiment of the local passive matrix cathode 450 coupled to the circuitry 322 to implement the sensing scheme to identify a failed micro-LED 251 of the micro-LED display 12. The circuitry 322 may use voltage sensing and an alternating current to identify the failed micro-LED 251. The schematic diagram of the local passive matrix cathode 450 and the circuitry 322 of FIG. 20 is substantially similar to the schematic diagram of the local passive matrix cathode 420 and the circuitry described with respect to FIG. 19 except the shunt 424 is coupled in series with the bias display voltage 398 and the local passive matrix cathode 450 includes a first modulated switch 492 and a second modulated switch 494. In particular, a first end of the shunt 424 may be coupled to the failed micro-LED 251 and a second end of the shunt 424 may be coupled to a bias display voltage 398. Additionally or alternatively, the first end of the shunt 424 may be coupled to the first modulated switch 492 and the second end of the shunt 424 may be coupled to the second modulated switch 494. The first modulated switch 492 and the second modulated switch 494 may be modulated when testing a micro-LED 182 to identify a failed micro-LED 251. For example, closing the first modulated switch 492 and opening the second modulated switch 494 may couple the local passive matrix cathode 450 to the circuitry 322 for testing, while opening the first modulated switch 492 and closing the second modulated switch 494 may disconnect the local passive matrix cathode 450 from the circuitry 322. As such, the circuitry 322 may test the micro-LEDs 182 to identify a failed micro-LED 251.

Figure 21:
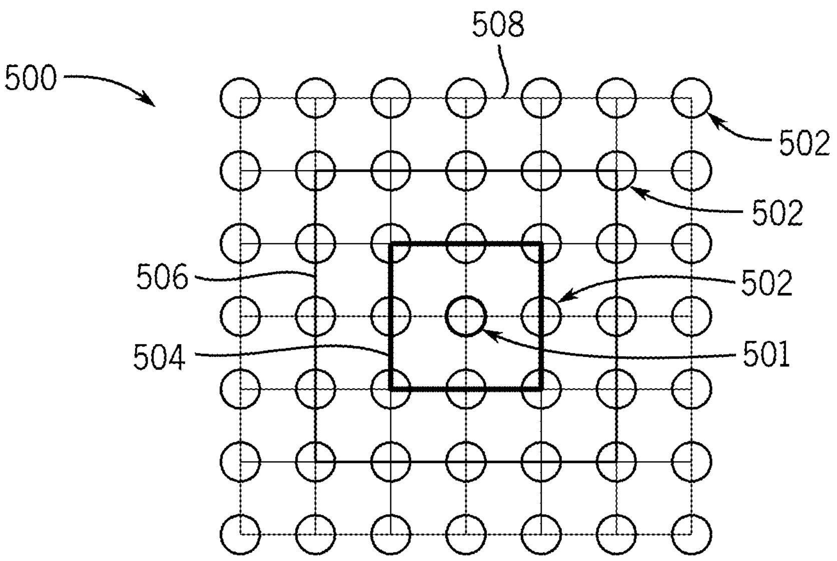
FIG. 21 is a schematic diagram of image data transmitted to the micro-LED display of FIG. 7 to implement a compensation scheme to mitigate for a failed micro-LED, in accordance with an embodiment of the present disclosure.

FIG. 21 is a schematic diagram of image data 500 transmitted to the micro-LED display 12 to implement a compensation scheme to mitigate (e.g., compensate) for a failed micro-LED 251. For example, a 1×1 compensation scheme may be used to compensate for the failed micro-LED 251, a 1×8 compensation scheme may be used to compensate for the failed micro-LED 251 and the other micro-LEDs along the same anode, and/or any suitable compensation may be used to reduce and/or eliminate perceivable visual image artifacts caused by the failed micro-LED 251. The image data 500 may be adjusted to hide an isolated pixel defect caused by the failed micro-LED 251 by adjusting luminance of surrounding pixels.

As illustrated by FIG. 21, a 7×7 compensation scheme may be applied to the image data 500 to reduce or eliminate image artifacts caused by a failed micro-LED 251. The image data 500 may include data for the display pixels 77 positioned in columns and rows. As discussed herein, the display pixels 77 may correspond to respective micro-LEDs 182 in the micro-LED display 12. For example, a failed display pixel 501 may correspond to the failed micro-LED 251 that may be identified using the compensation scheme discussed herein. The image data sent to the failed display pixel 501 may be set to a gray level 0 to reduce current stress on the respective micro-LED 182. That is, the failed display pixel 501 may not emit light.

The failed display pixel 501 may be surrounded by functioning display pixels 502. The image data 500 may be adjusted to adjust a luminance corresponding to the functional display pixels 502. For example, image data corresponding to a first group 504 of display pixels directly adjacent to the failed display pixel 501 may include increased luminance, the image data corresponding to a second group 506 of display pixels adjacent to the first group 504 of display pixels may include decreased luminance, and the image data corresponding to a third group 508 of display pixels adjacent to the second group 506 may include increased luminance. To this end, a first gain mask may be applied to the image data corresponding to the first group 504 of display pixels, a second gain mask may be applied to image data corresponding to the second group 506 of display pixels, a third gain mask may be applied to image data corresponding to the third group 508 of display pixels. That is, current for the failed display pixel 501 may be reduced and distributed to the surrounding functioning display pixels 502. In other instances, a gain map corresponding to a 7×7 arrangement of display pixels may be generated and applied to the image data. With the adjusted luminance, image artifacts may be reduced or eliminated from the frame of image content displayed on the micro-LED display 12.

Figure 22:
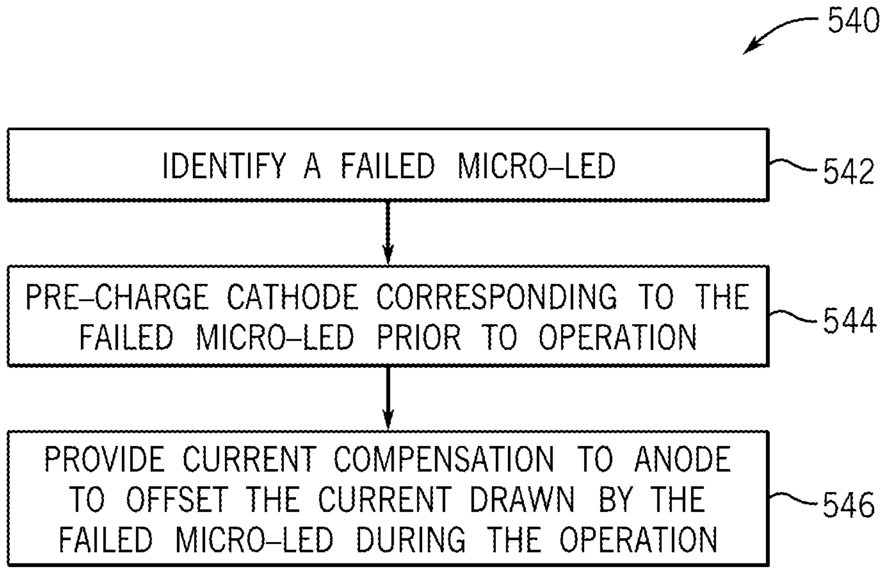
FIG. 22 is a flowchart of an example method for identifying and mitigating a failed micro-LED, in accordance with an embodiment of the present disclosure.

FIG. 22 is a flowchart of an example method 540 for identifying and mitigating (e.g., compensating) a failed micro-LED. While the process of FIG. 22 is described using process blocks in a specific sequence, it should be understood that the present disclosure contemplates that the described process blocks may be performed in different sequences than the sequence illustrated, and certain described process blocks may be skipped or not performed altogether.

At block 542, processing circuitry (e.g., the processor core complex, image processing circuitry, image compensation circuitry, display circuitry) identifies a failed micro-LED. For example, the micro-LEDs of the micro-LED display may be individually tested to identify a failed micro-LED. For testing, a first switch corresponding to the current source and/or the analog power supply may open to block current from flowing to the micro-LEDs and a second switch corresponding to test circuitry for testing may close to create a path between the circuitry and the micro-LEDs. To test a micro-LED, a switch corresponding to the micro-LED may close to form a path between the testing circuitry and the micro-LED being tested. Additionally or alternatively, switches corresponding to micro-LEDs not being tested may open to block voltage from flowing to the remaining micro-LEDs. The micro-LED may be coupled to a bias voltage that provides a voltage to the micro-LED. If the analog opamp receives a current from the micro-LED and outputs an analog voltage, then the micro-LED may be determined to be failed. Additionally or alternatively, a position of the failed micro-LED may be determined.

At block 544, the processing circuitry pre-charges a cathode corresponding to the failed micro-LED prior to operation. The cathode may be charged to a voltage equivalent to a voltage of the anode to reduce or eliminate current draw by the failed micro-LED. To this end, the micro-LED may be coupled to a capacitor in series, and the capacitor may store the pre-charge voltage. The cathode may be pre-charged and/or floated while other rows may be emitting light. As such, when the row including the failed micro-LED emits light, the cathode may be pre-charged and/or floated prior to driving the micro-LEDs coupled to the cathode to emit light, thereby reducing or eliminating current pull by the failed micro-LED.

At block 546, the processing circuitry provides current compensation to an anode to offset current drawn by the failed micro-LED during the operation. In certain instances, the current provided to the anode containing the failed micro-LED may be increased to compensate for current drawn by the failed micro-LED. In other instances, the current directed to the failed micro-LED may be distributed to remaining micro-LEDs in the anode with the failed micro-LED. That is, the current may be redistributed to the micro-LEDs coupled with the failed micro-LED along the same anode. As such, image artifacts may be reduced and/or eliminated in a frame of image content displayed on the micro-LED.

Figure 23:
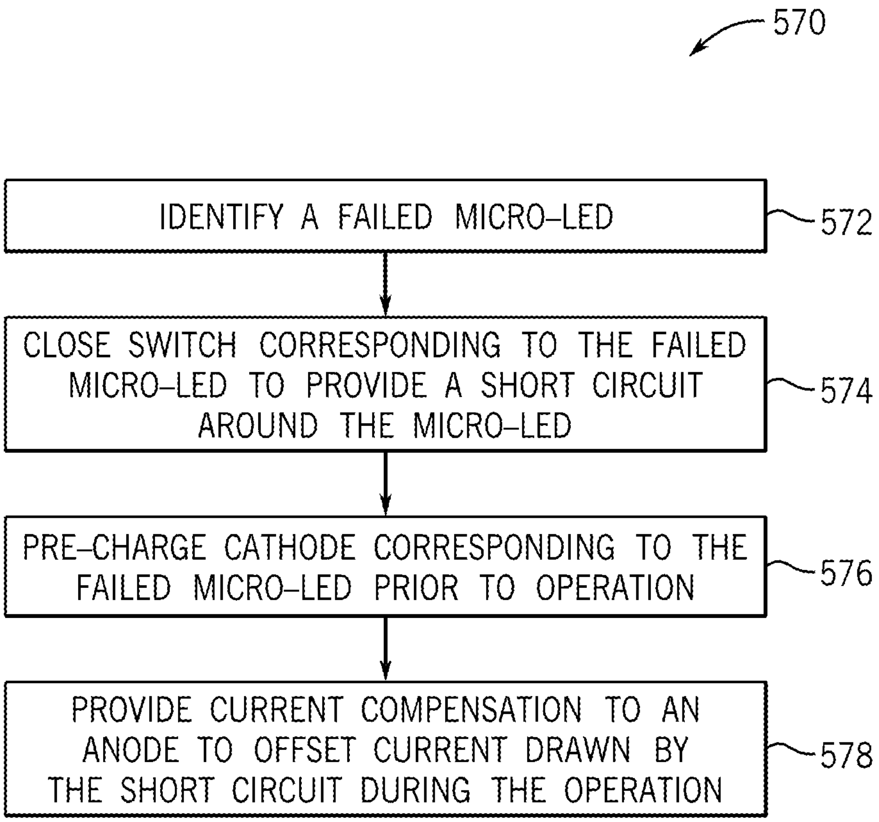
FIG. 23 is a flowchart of an example method for compensating for a failed micro-LED, in accordance with an embodiment of the present disclosure.

FIG. 23 is a flowchart of an example method 570 for compensating for a failed micro-LED. While the process of FIG. 23 is described using process blocks in a specific sequence, it should be understood that the present disclosure contemplates that the described process blocks may be performed in different sequences than the sequence illustrated, and certain described process blocks may be skipped or not performed altogether.

At block 572, processing circuitry identifies a failed micro-LED, similar to block 542 described with respect to FIG. 22.

At block 574, the processing circuitry closes a switch corresponding to a defective micro-LED to short circuit around the micro-LED. For example, the micro-LEDs may be coupled in parallel to a respective switch. If the switch is open, then current and/or voltage may flow to the micro-LED. If the switch is closed, then the current and/or voltage may flow through the switch, since the switch provides a path with less resistance in comparison to the path provided by the micro-LED. As such, the failed micro-LED may not be driven and may not emit light.

At block 576, the processing circuitry pre-charges a cathode corresponding to the failed micro-LED prior to operation, similar to block 544 described with respect to FIG. 22. For example, the cathode may be pre-charged and then floated while other rows may be emitting light.

At block 578, the processing circuitry provides current compensation to an anode to offset the current drawn by the short circuit during operation, similar to block 546 described with respect to FIG. 22. For example, the current source may increase the current provided to the anode. In another example, the current intended for the failed micro-LED may be distributed among the remaining micro-LEDs. Still in another example, the image data may be adjusted for surrounding micro-LEDs, as such, the current corresponding to the surrounding micro-LEDs may be adjusted.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A display system, comprising:

a plurality of light emitting diodes coupled to a common anode; and a plurality of first switches respectively coupled to the plurality of light emitting diodes, wherein a first switch of the plurality of first switches is coupled in parallel to a first light emitting diode of the plurality of light emitting diodes, and wherein the first switch is configured to short the first light emitting diode of the plurality of light emitting diodes through a defined resistance.

2. The display system of claim 1, wherein the first light emitting diode is configured to be coupled to a cathode, and wherein the cathode is configured to be pre-charged and floated based on the first light emitting diode being a failed light emitting diode.

3. The display system of claim 1, wherein the plurality of light emitting diodes are configured to be driven with an increased emission time based on the first light emitting diode being a failed light emitting diode.

4. The display system of claim 1, comprising sensing circuitry configured to:

identify the first light emitting diode as a failed light emitting diode based on receiving a current from the first light emitting diode when the first light emitting diode is driven by a voltage less than a turn-on voltage of the first light emitting diode.

5. The display system of claim 4, comprising an additional switch configured to couple the plurality of light emitting diodes to a power source, and wherein the power source is configured to drive each light emitting diode of the plurality of light emitting diodes for the sensing circuitry to identify the failed light emitting diode.

6. The display system of claim 4, wherein the sensing circuitry comprises one or more light emitting diode selection switches, a resistor, a capacitor, an analog opamp, a power switch, a cascode circuit mirror, and/or a modulated switch.

7. The display system of claim 1, comprising display circuitry configured to:

receive image data for the first light emitting diode; and set the image data for the first light emitting diode to gray level zero based on the first light emitting diode being a failed light emitting diode.

8. A display, comprising:

a plurality of light emitting diodes coupled to a common anode;

a power source configured to drive a light emitting diode of the plurality of light emitting diodes to emit light;

a switch configured to couple the light emitting diode to the power source; and sensing circuitry configured to identify the light emitting diode as a failed light emitting diode based on a current from the light emitting diode when the power source is driving the light emitting diode.

9. The display of claim 8, wherein the sensing circuitry comprises a virtual ground clamp coupled to the light emitting diode configured to limit a magnitude of a voltage received by the sensing circuitry from the light emitting diode.

10. The display of claim 8, comprising an additional switch coupled to the light emitting diode in parallel, wherein the additional switch is configured to short the light emitting diode based on identifying the failed light emitting diode, and wherein the additional switch comprises a defined resistance.

11. The display of claim 8, comprising a cathode coupled to the light emitting diode, wherein the cathode is configured to be pre-charged and floated based on identifying the failed light emitting diode.

12. The display of claim 11, wherein the cathode is selectively coupled to a bias voltage and a negative voltage, and wherein the plurality of light emitting diodes are configured to be driven to emit light when the cathode is coupled to the negative voltage.

13. The display of claim 8, comprising processing circuitry configured to:

receive image data corresponding to the light emitting diode;

identify a position corresponding to the light emitting diode within the image data; and set the image data corresponding to the light emitting diode to a gray level zero based on identifying the light emitting diode as the failed light emitting diode.

14. The display of claim 13, comprising a plurality of light emitting diodes, wherein the processing circuitry is configured to:

apply a gain mask to additional image data adjacent to the image data corresponding to the failed light emitting diode, wherein the gain mask is configured to increase current for driving the plurality of light emitting diodes to emit light.

15. A display device, comprising:

a plurality of light emitting diodes coupled to a common anode; and processing circuitry configured to:

identify a first light emitting diode of the plurality of light emitting diodes as a failed light emitting diode based on a current leaked from the first light emitting diode;

receive image data corresponding to the plurality of light emitting diodes;

set a portion of the image data corresponding to the first light emitting diode to gray level zero based on identifying the first light emitting diode as the failed light emitting diode; and apply a gain mask to a remaining portion of the image data corresponding to a set of light emitting diodes of the plurality of light emitting diodes adjacent to the first light emitting diode.

16. The display device of claim 15, wherein the processing circuitry is configured to drive the set of light emitting diodes with an increased current based on the gain mask.

17. The display device of claim 15, comprising a switch coupled in parallel to the first light emitting diode, wherein the switch is configured to short the first light emitting diode through a defined resistance.

18. The display device of claim 17, wherein the processing circuitry is configured to drive the set of light emitting diodes with an increased duty cycle based on the first light emitting diode being the failed light emitting diode.

19. The display device of claim 15, wherein the processing circuitry is configured to identify the first light emitting diode as the failed light emitting diode by:

instructing a switch to couple a power source to the first light emitting diode;

instructing the power source to drive a voltage to the first light emitting diode; and receiving the current leaked from the first light emitting diode.

20. The display device of claim 15, wherein the processing circuitry is configured to instruct a power source to pre-charge and float a cathode coupled to first light emitting diode.

* * * * *